United States Patent
Sasaki et al.

(10) Patent No.: US 10,131,358 B2
(45) Date of Patent: Nov. 20, 2018

(54) CONTROL APPARATUS OF THE IDLE ROTATION SPEED OF THE INTERNAL COMBUSTION ENGINE OF A VEHICLE WITH AN AUTOMATIC TRANSMISSION AND A TORQUE CONVERTER

(71) Applicant: TOYOTA JIDOSHA KABUSHIKI KAISHA, Toyota-shi, Aichi-ken (JP)

(72) Inventors: Yu Sasaki, Miyoshi (JP); Takeshi Ishiwada, Anjo (JP); Shuji Toyokawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 620 days.

(21) Appl. No.: 14/428,567

(22) PCT Filed: Nov. 29, 2013

(86) PCT No.: PCT/JP2013/007014
§ 371 (c)(1),
(2) Date: Mar. 16, 2015

(87) PCT Pub. No.: WO2014/097555
PCT Pub. Date: Jun. 26, 2014

(65) Prior Publication Data
US 2015/0232101 A1    Aug. 20, 2015

(30) Foreign Application Priority Data

Dec. 19, 2012    (JP) .................................. 2012-277042

(51) Int. Cl.
*B60W 30/192*    (2012.01)
*B60W 30/18*    (2012.01)
(Continued)

(52) U.S. Cl.
CPC ........ *B60W 30/192* (2013.01); *B60W 10/023* (2013.01); *B60W 10/06* (2013.01);
(Continued)

(58) Field of Classification Search
CPC ........... B60W 10/06; B60W 30/18027; B60W 30/18063; B60W 30/192;
(Continued)

(56) References Cited

U.S. PATENT DOCUMENTS 5,484,351 A * 1/1996 Zhang ................... B60W 10/06
                                                            477/110
6,035,252 A * 3/2000 Dixon ................. F02D 41/1402
                                                            701/102

(Continued)

FOREIGN PATENT DOCUMENTS

DE          4321413 A1    1/1995
DE    102004043921 A1    4/2005
(Continued)

OTHER PUBLICATIONS

Mineau, Christophe; PCT Written Opinion of the International Searching Authority for PCT/JP2013/007014; dated Jun. 19, 2015.*

*Primary Examiner* — Justin Holmes
(74) *Attorney, Agent, or Firm* — Oliff PLC

(57) ABSTRACT

A vehicle control apparatus which includes an engine, an automatic transmission, and drive wheels transmitted with the power of the engine through the automatic transmission, the automatic transmission including a torque converter connected with the engine, a transmission mechanism connected with the torque converter, the torque converter having a pump impeller connected with the engine, and a turbine runner connected with the transmission mechanism, the vehicle control apparatus for a vehicle further including: an input shaft rotational speed sensor that detects the rota- (Continued)

tional speed Nt of the turbine runner, and a control unit to control the engine to have the rotational speed Ne of the engine raised when a determination condition in which the rotational speed Nt of the turbine runner is not raised even within a standard time T1 lapsed after the engine is started is established.

6 Claims, 17 Drawing Sheets

(51) Int. Cl.
    *F16H 61/64*     (2006.01)
    *F02D 41/02*     (2006.01)
    *B60W 10/02*     (2006.01)
    *B60W 10/06*     (2006.01)

(52) U.S. Cl.
    CPC ... *B60W 30/18063* (2013.01); *F02D 41/0215* (2013.01); *F16H 61/64* (2013.01); *Y10T 477/6333* (2015.01)

(58) Field of Classification Search
    CPC . B60W 2510/0638; B60W 2510/1005; B60W 2540/10; B60W 2710/065; F02D 41/0215; F02D 41/1497; F02D 2200/023; F02D 2200/602; F02D 41/064; F02D 41/08; F02D 2400/12; F02D 41/0225; F02C 41/08; F02C 2400/12; F02C 41/0225; F16H 2059/385; F16H 2312/02; F16H 63/50

See application file for complete search history.

(56) References Cited

U.S. PATENT DOCUMENTS

| | | |
|---|---|---|
| 2005/0060077 A1 | 3/2005 | Slayton et al. |
| 2009/0312927 A1 | 12/2009 | Ishiwada |
| 2010/0170740 A1 | 7/2010 | Lochocki, Jr. et al. |
| 2011/0276239 A1* | 11/2011 | Nagashima ............ F02D 37/02 701/54 |

FOREIGN PATENT DOCUMENTS

| | | |
|---|---|---|
| DE | 112007002635 T5 | 1/2010 |
| DE | 102009059864 A1 | 8/2010 |
| JP | 2010-007815 A | 1/2010 |

* cited by examiner

[Fig. 1]
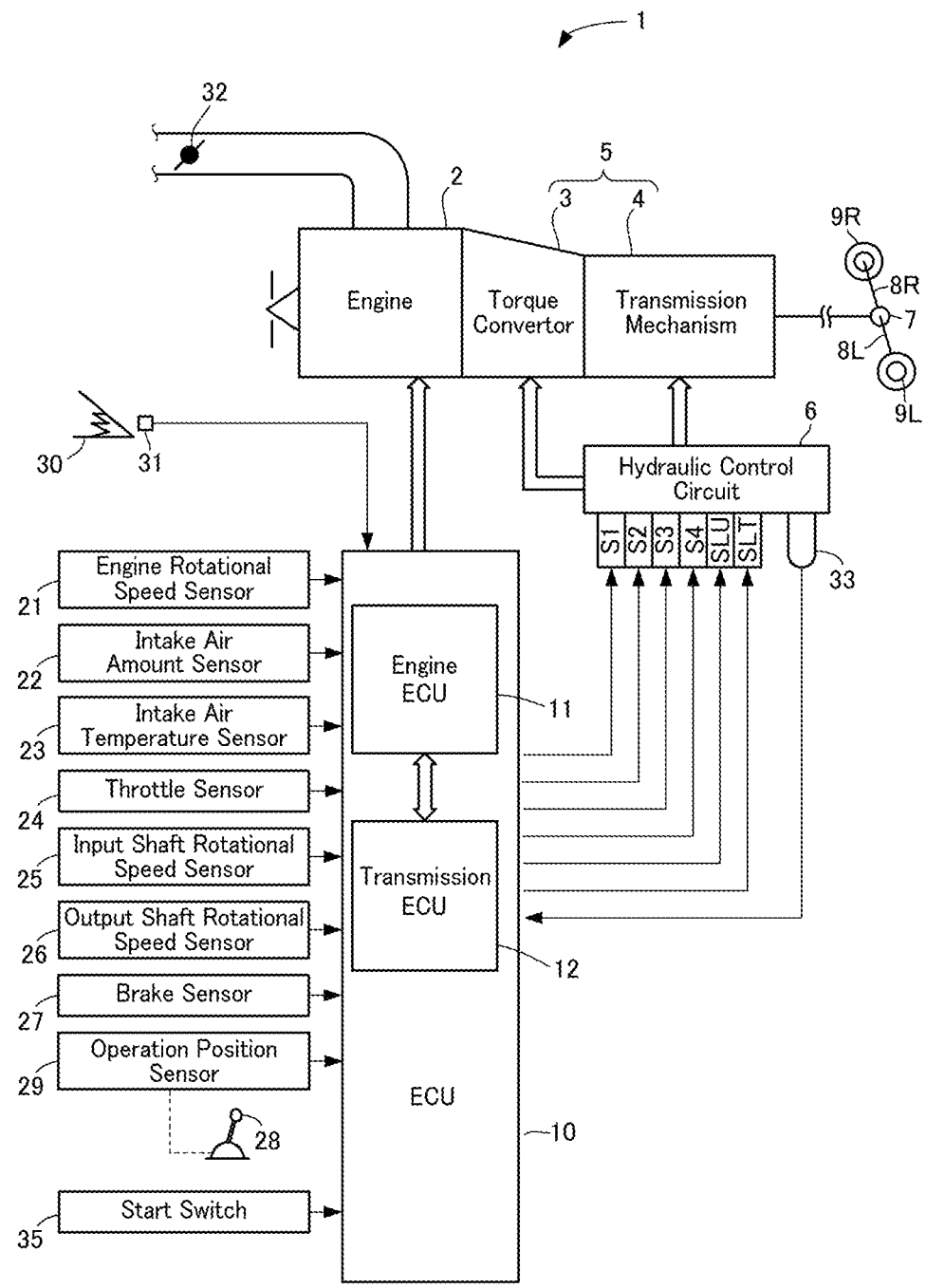

[Fig. 2]
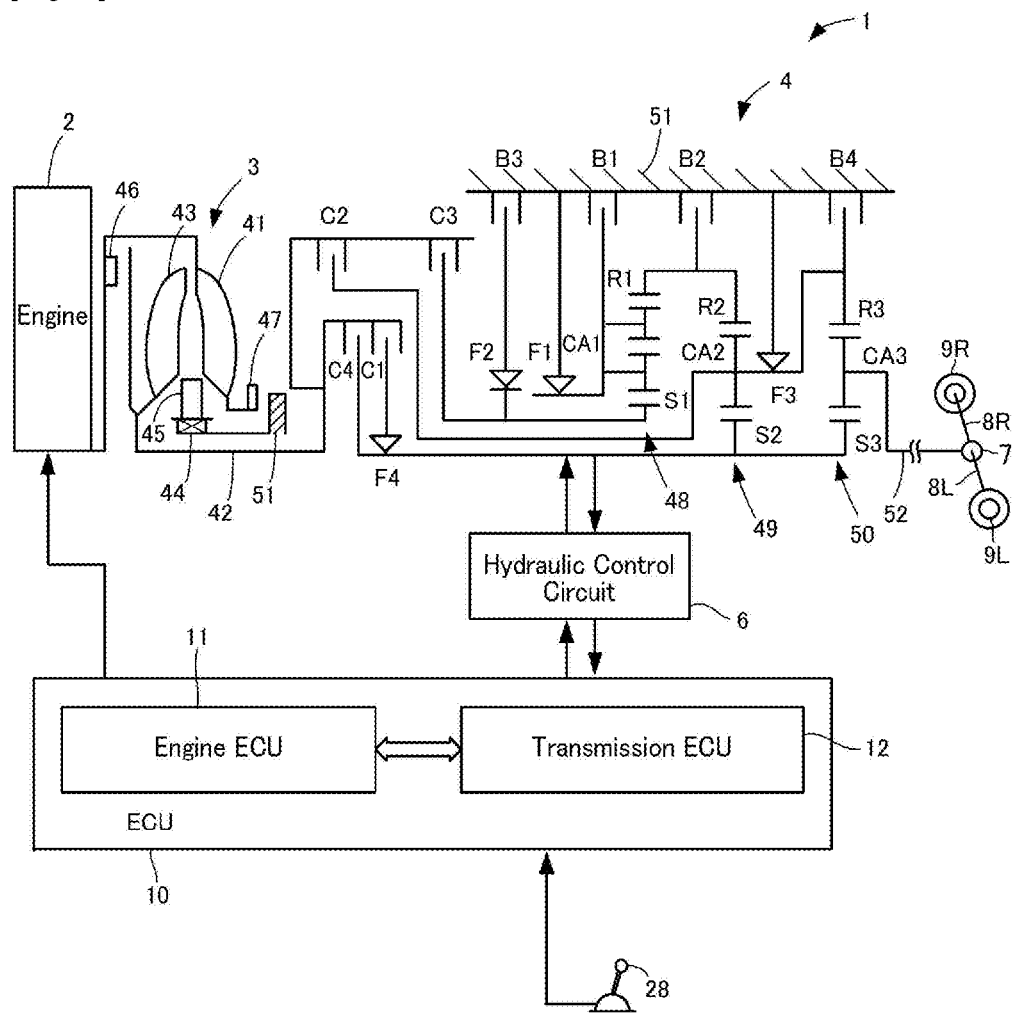
[Fig. 3]
|   |     | C1 | C2 | C3 | C4  | B1  | B2 | B3 | B4  | F1  | F2 | F3 | F4 |
|---|-----|----|----|----|-----|-----|----|----|-----|-----|----|----|----|
|   | P   |    |    |    |     |     |    |    |     |     |    |    |    |
|   | R   |    |    | O  |     | (O) |    |    | O   | O   |    |    |    |
|   | N   |    |    |    |     |     |    |    |     |     |    |    |    |
| D | 1st | O  |    |    | (O) |     |    |    | (O) |     |    | O  | O  |
|   | 2nd | O  |    |    | (O) | (O) | O  |    |     | O   | O  |    | O  |
|   | 3rd | O  |    | O  | (O) | (O) |    | △  |     | O   |    |    | O  |
|   | 4th | O  | O  | △  | (O) |     |    | △  |     |     |    |    | O  |
|   | 5th | △  | O  | O  |     | O   |    | △  |     |     |    |    |    |
|   | 6th | △  | O  |    |     | △   | O  | △  |     |     |    |    |    |
○ Engagement
(○) Engagement At Engine Brake Time
△ Engagement Not Contributing To Power Transmission

[Fig. 4]
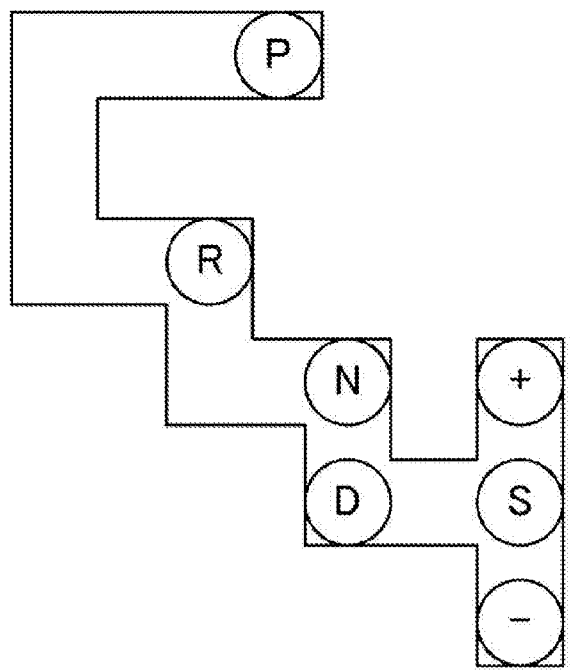
[Fig. 5]
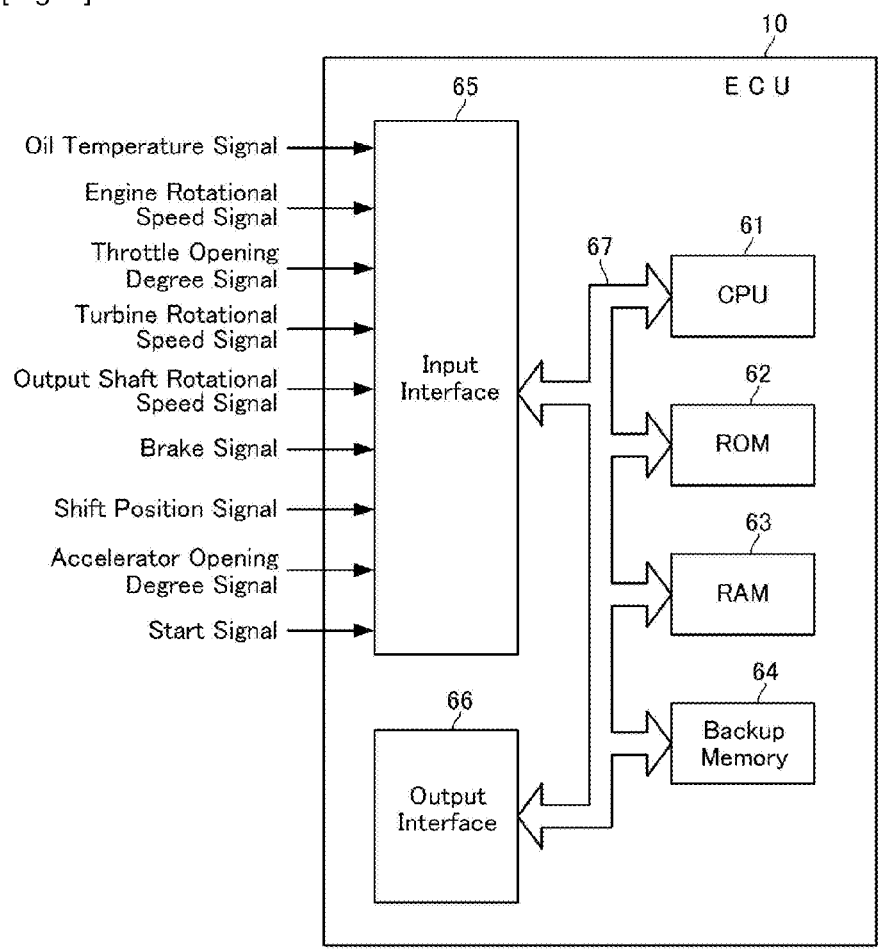

[Fig. 6]
| | Oil Temperature [°C] | | | |
|---|---|---|---|---|
| | 0 | 20 | 40 | 60 |
| T1 [ms] | 100 | 100 | 100 | 250 |
[Fig. 7]
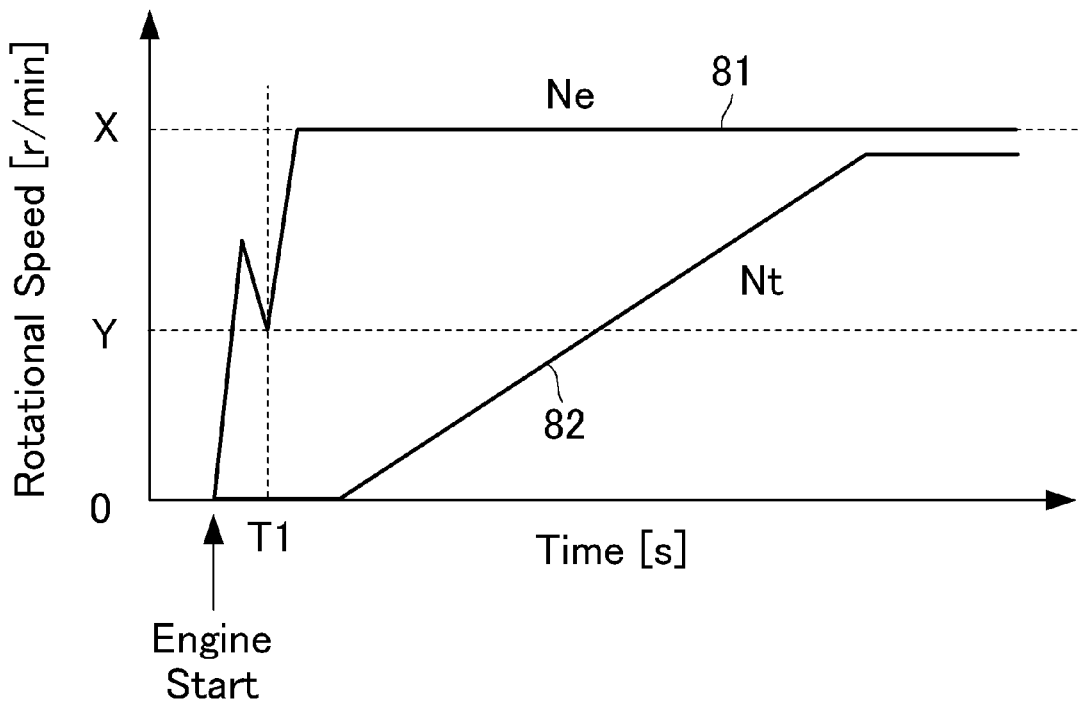
[Fig. 8]
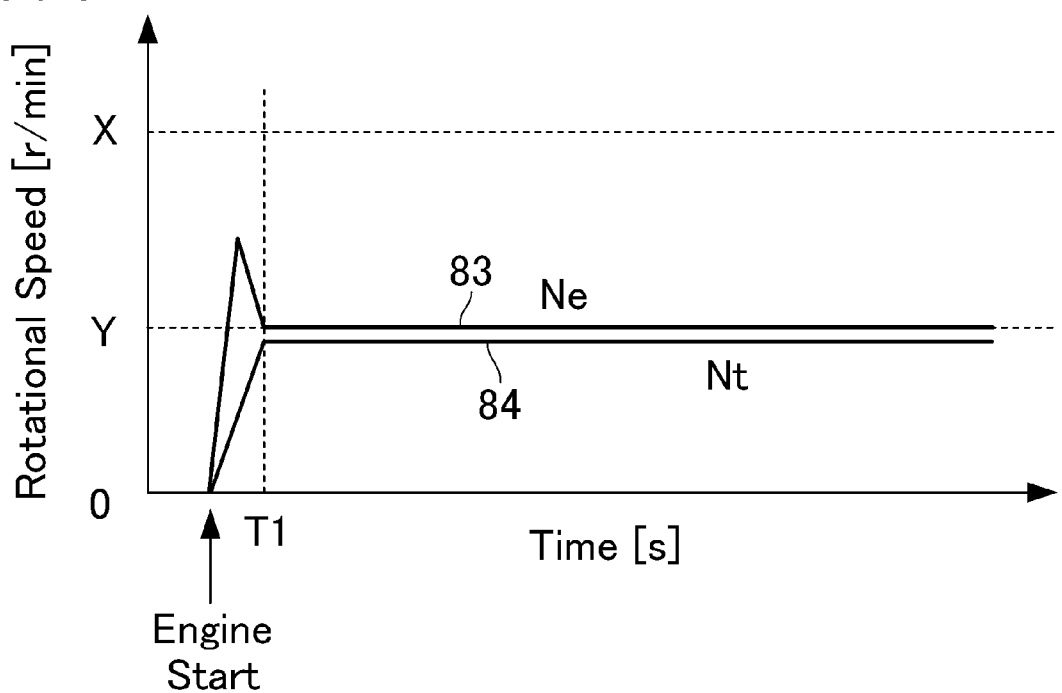

[Fig. 9]
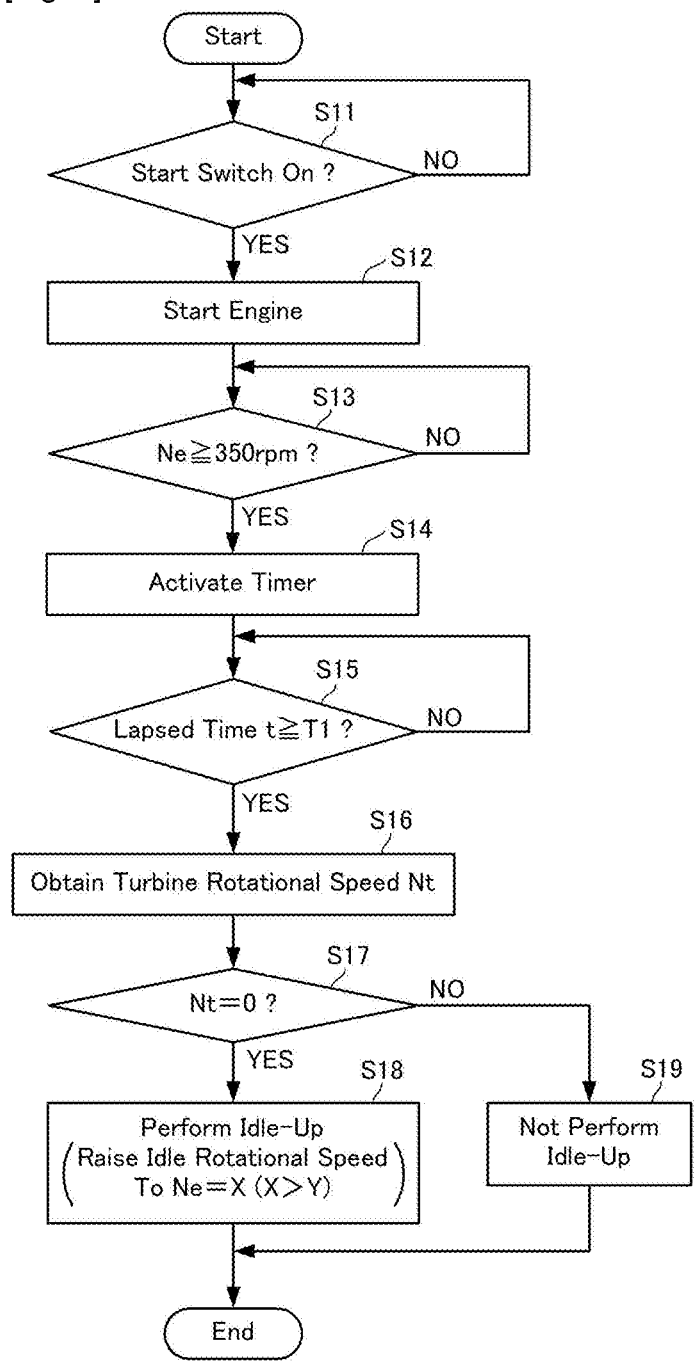

[Fig. 10]
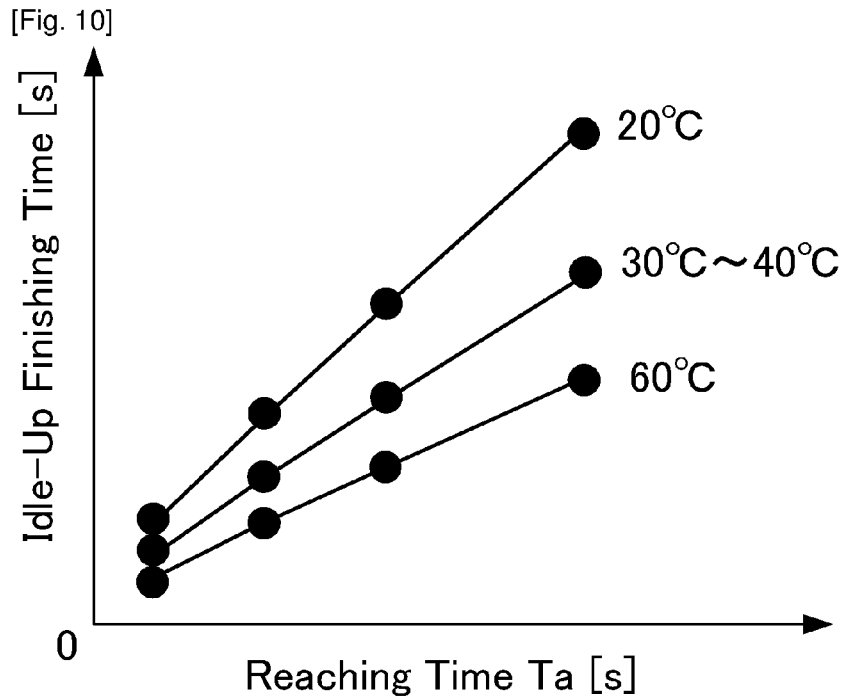
[Fig. 11]
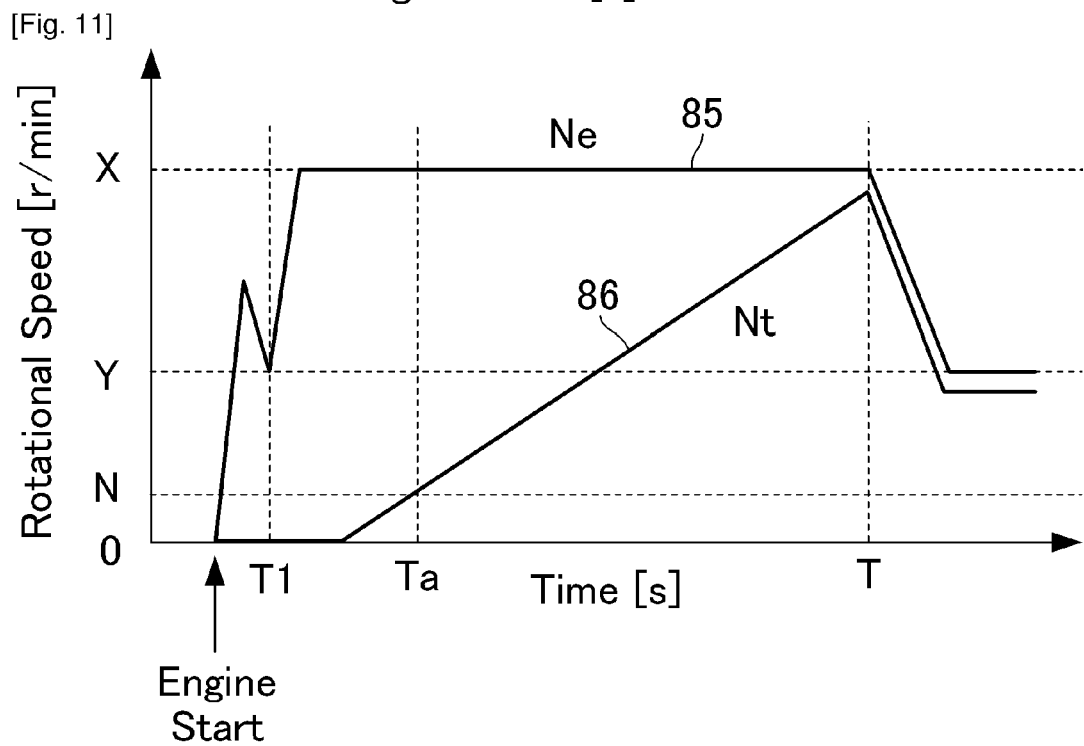

[Fig. 12]
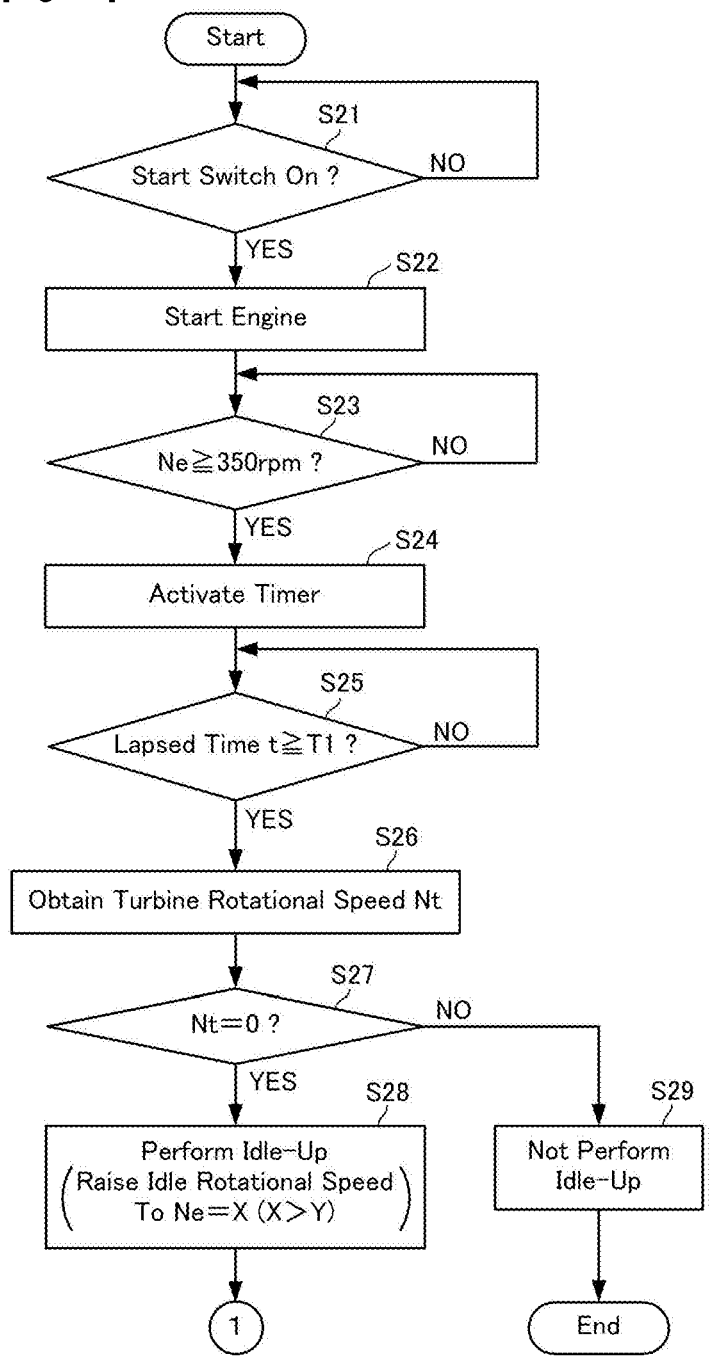

[Fig. 13]
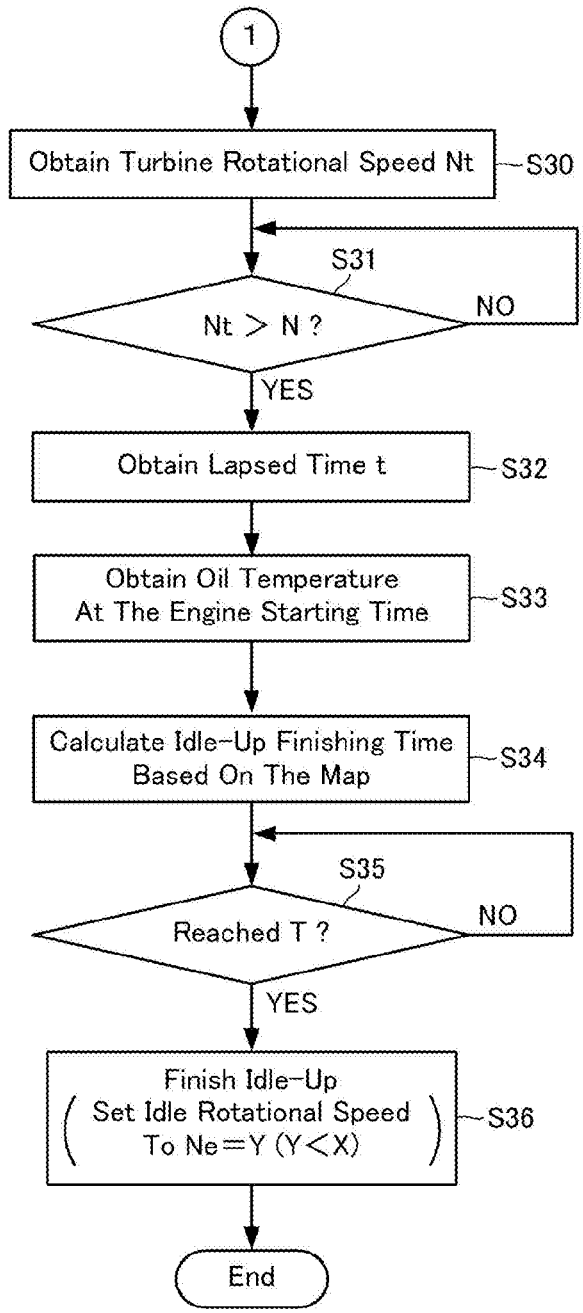
[Fig. 14]
| | Oil Temparature [°C] | | | |
| --- | --- | --- | --- | --- |
| | 0 | 20 | 40 | 60 |
| Set Speed Ratio A | 0.49 | 0.47 | 0.45 | 0.41 |

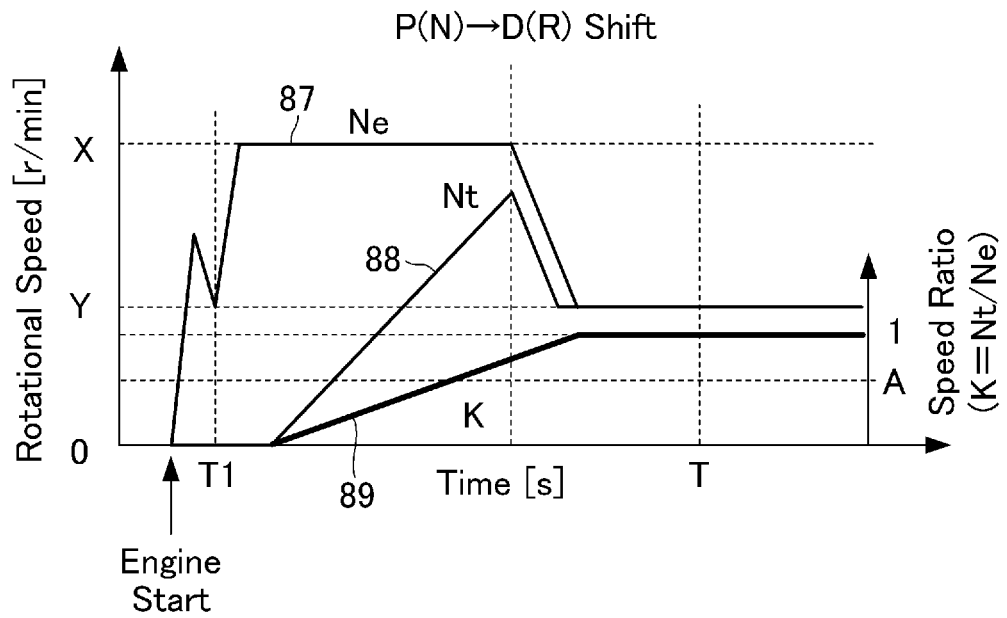
[Fig. 15]
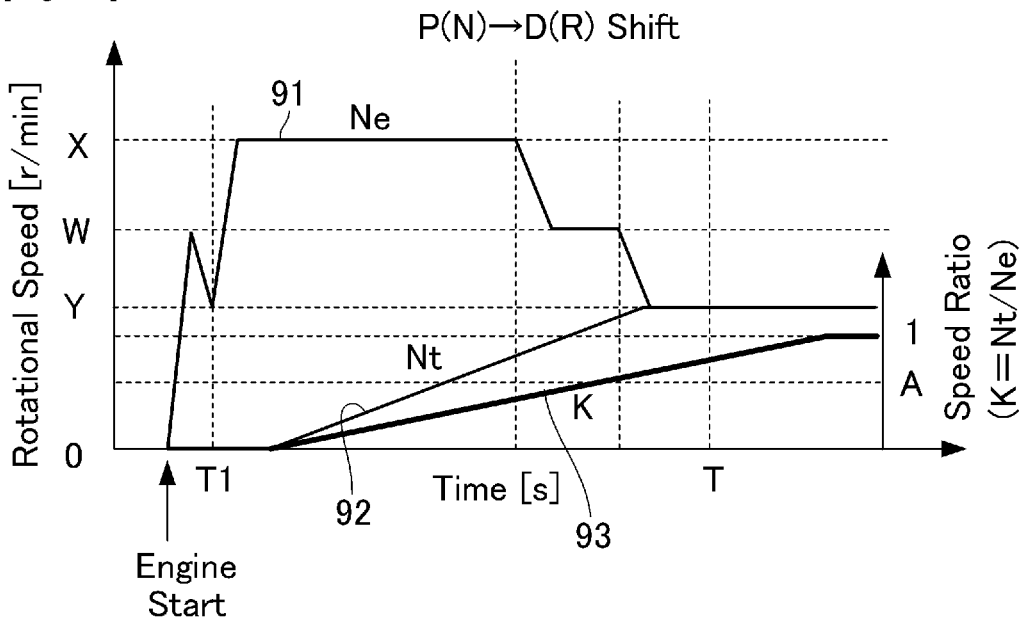
[Fig. 16]

[Fig. 17]
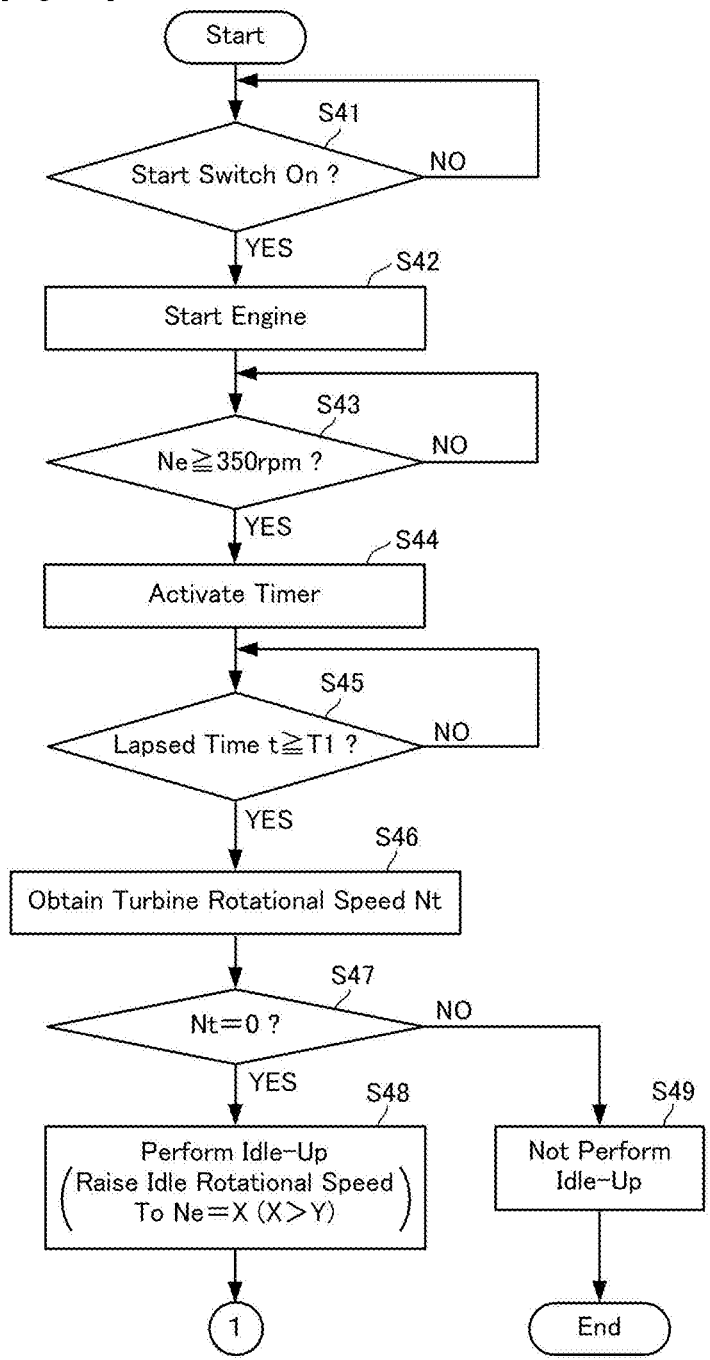

[Fig. 18]
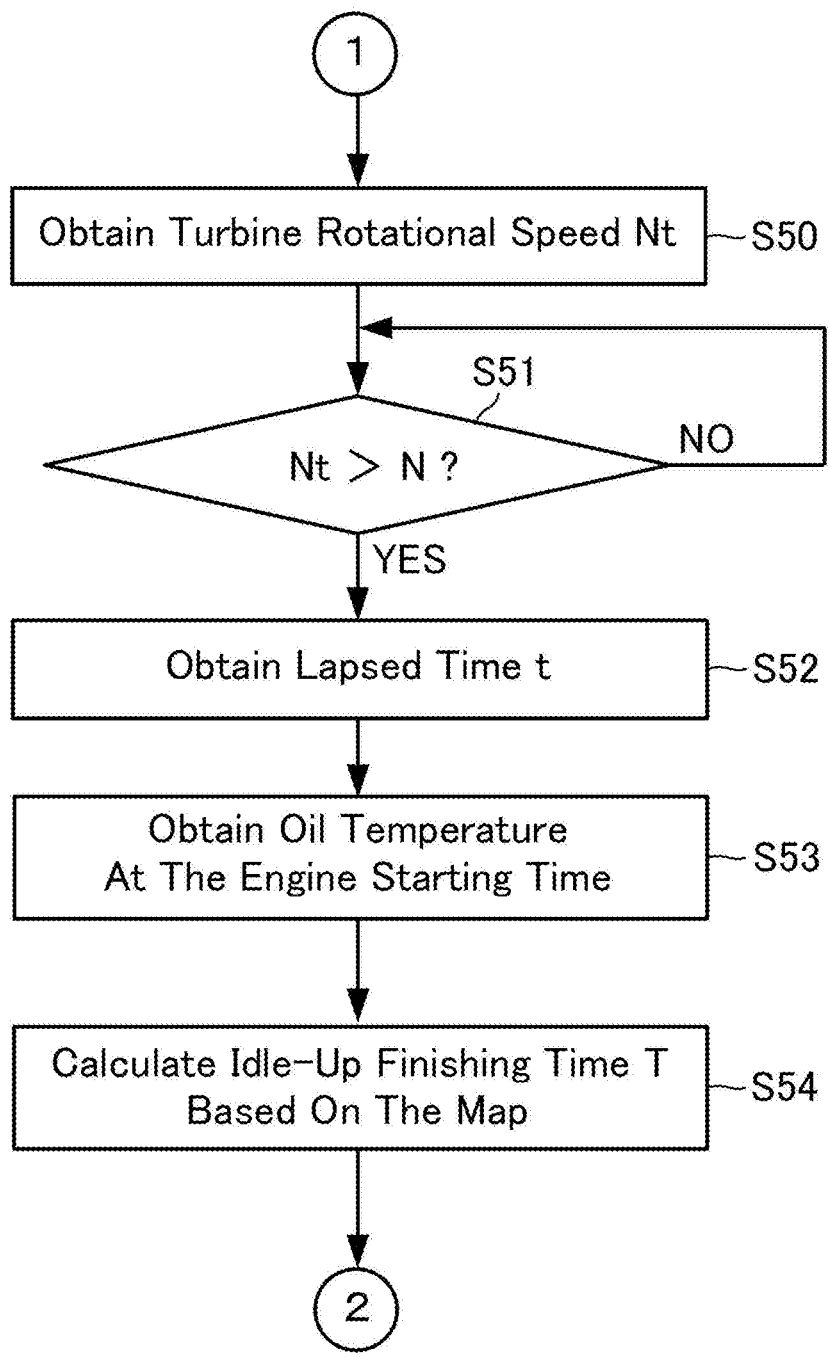

[Fig. 19]
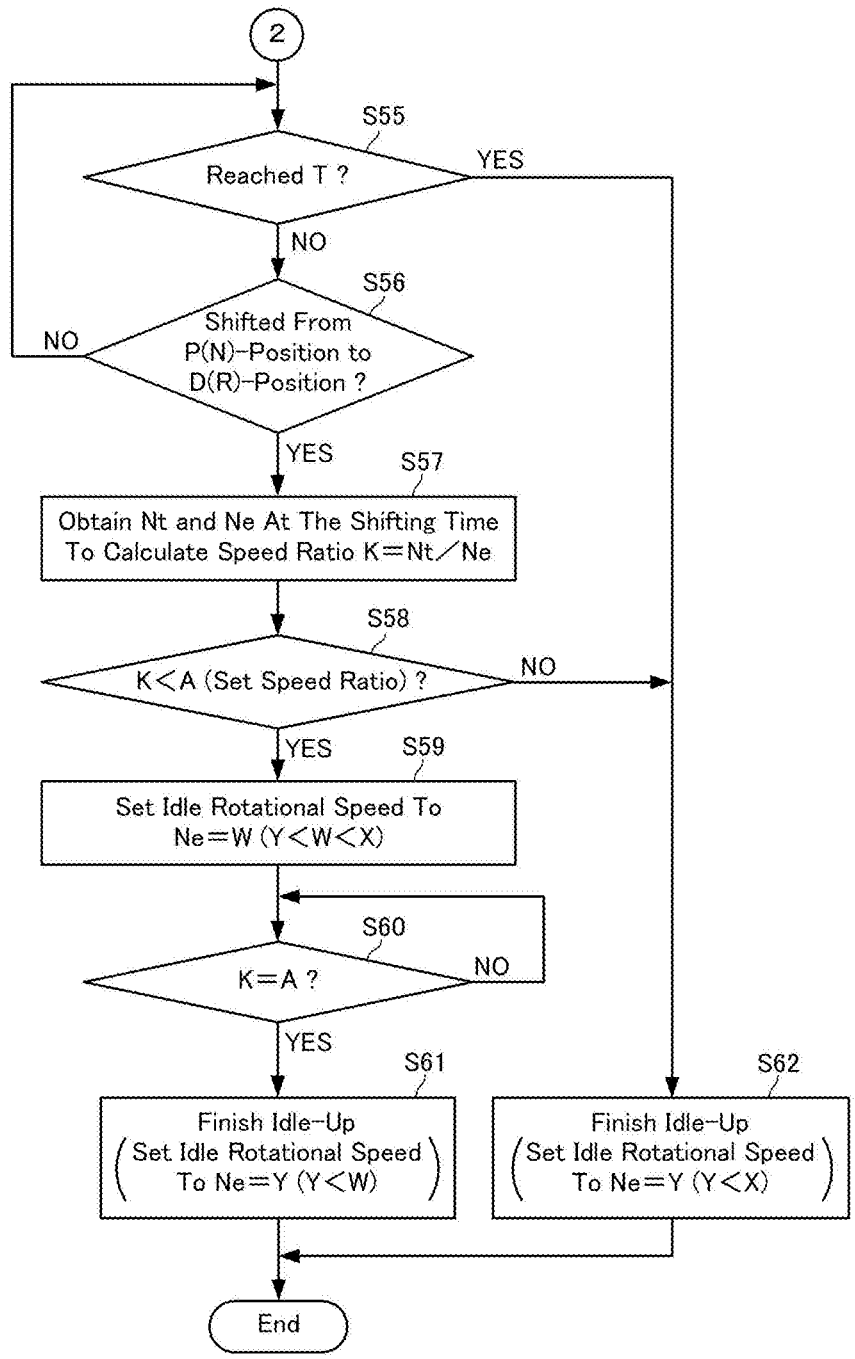

[Fig. 20]
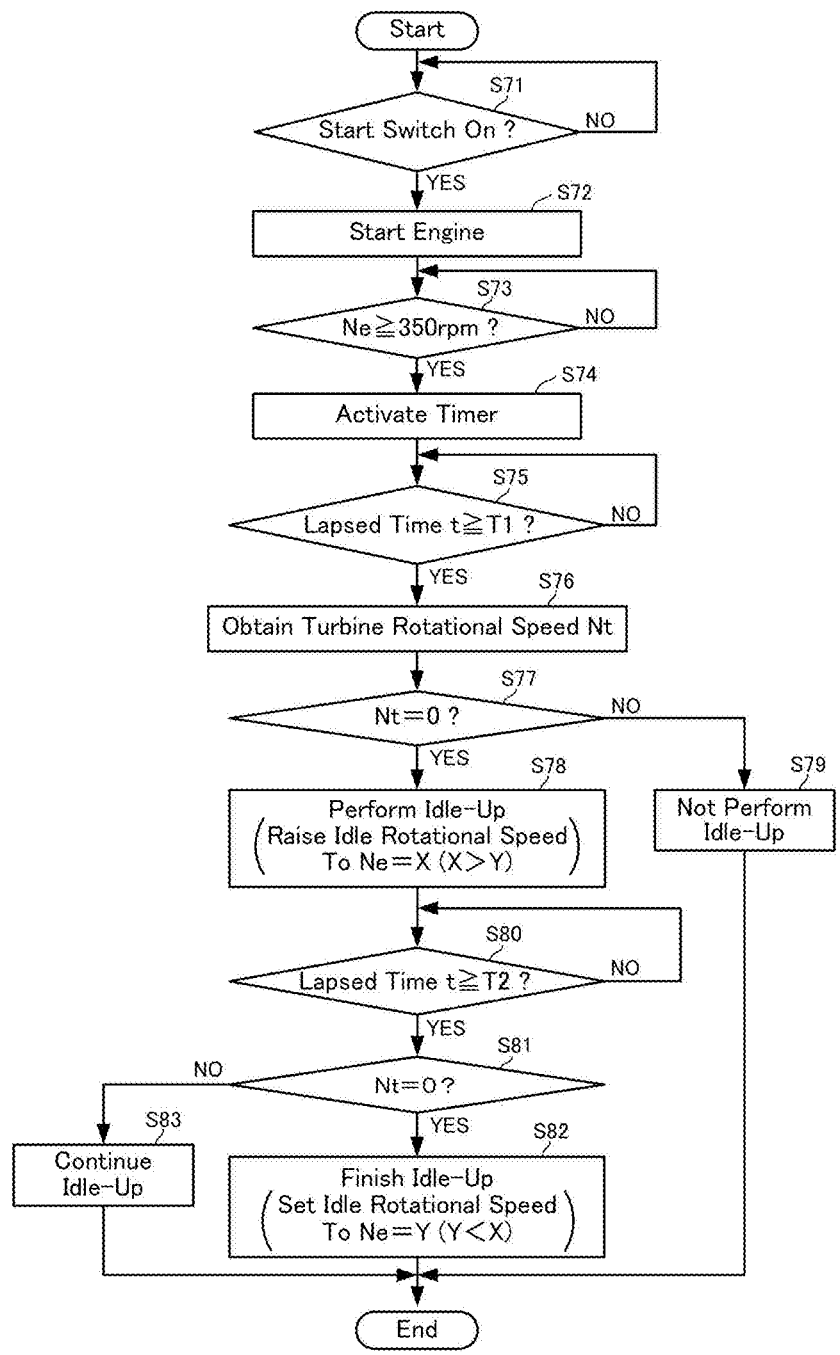

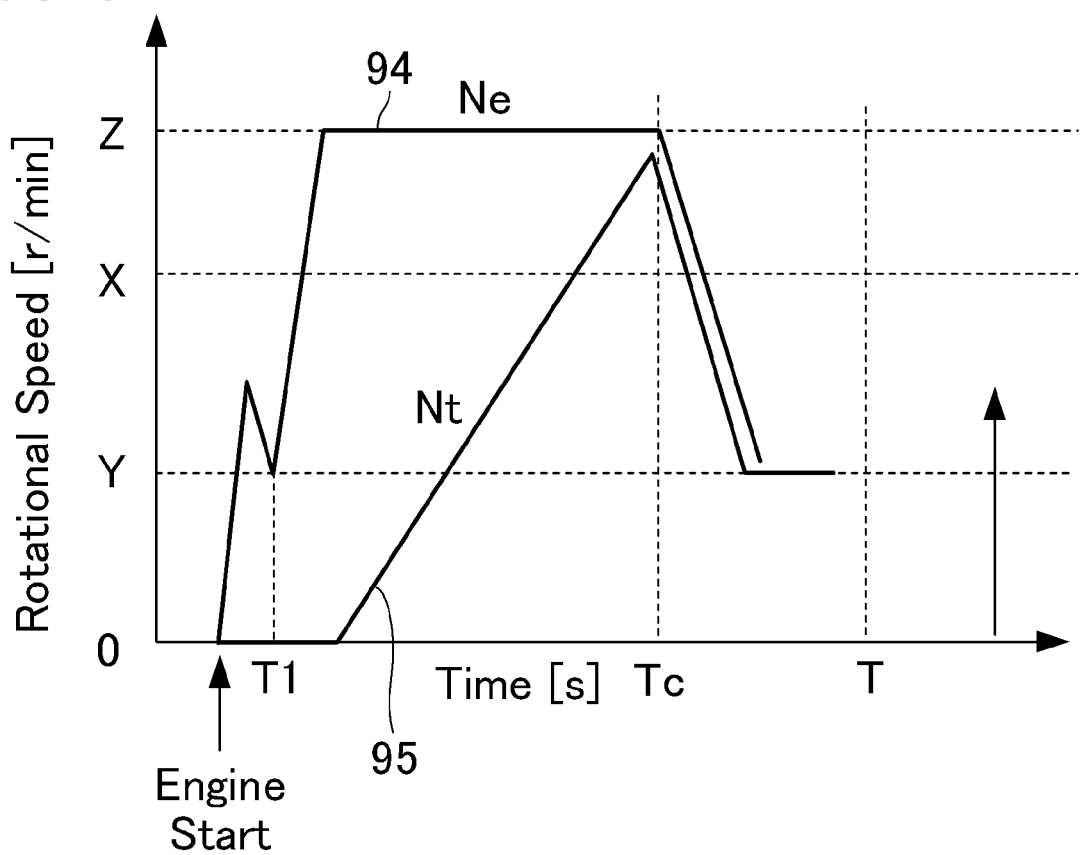
[Fig. 21]

[Fig. 22]
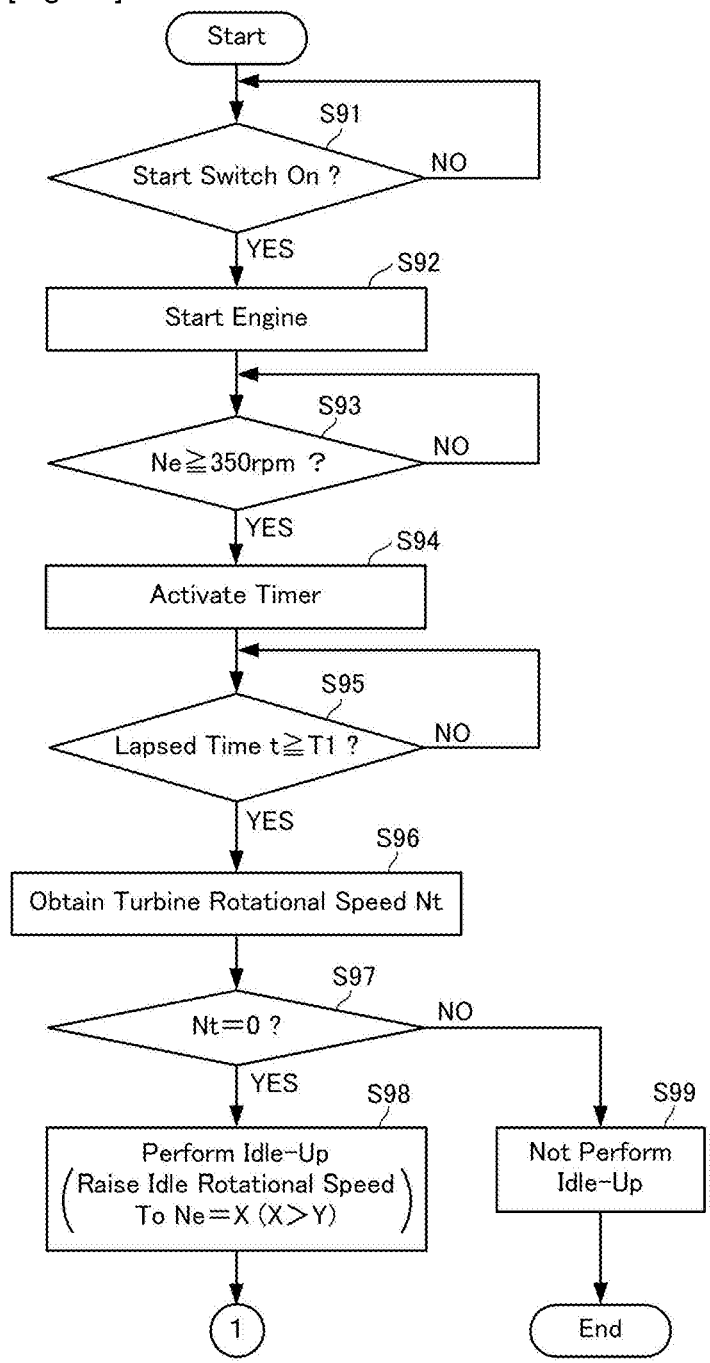

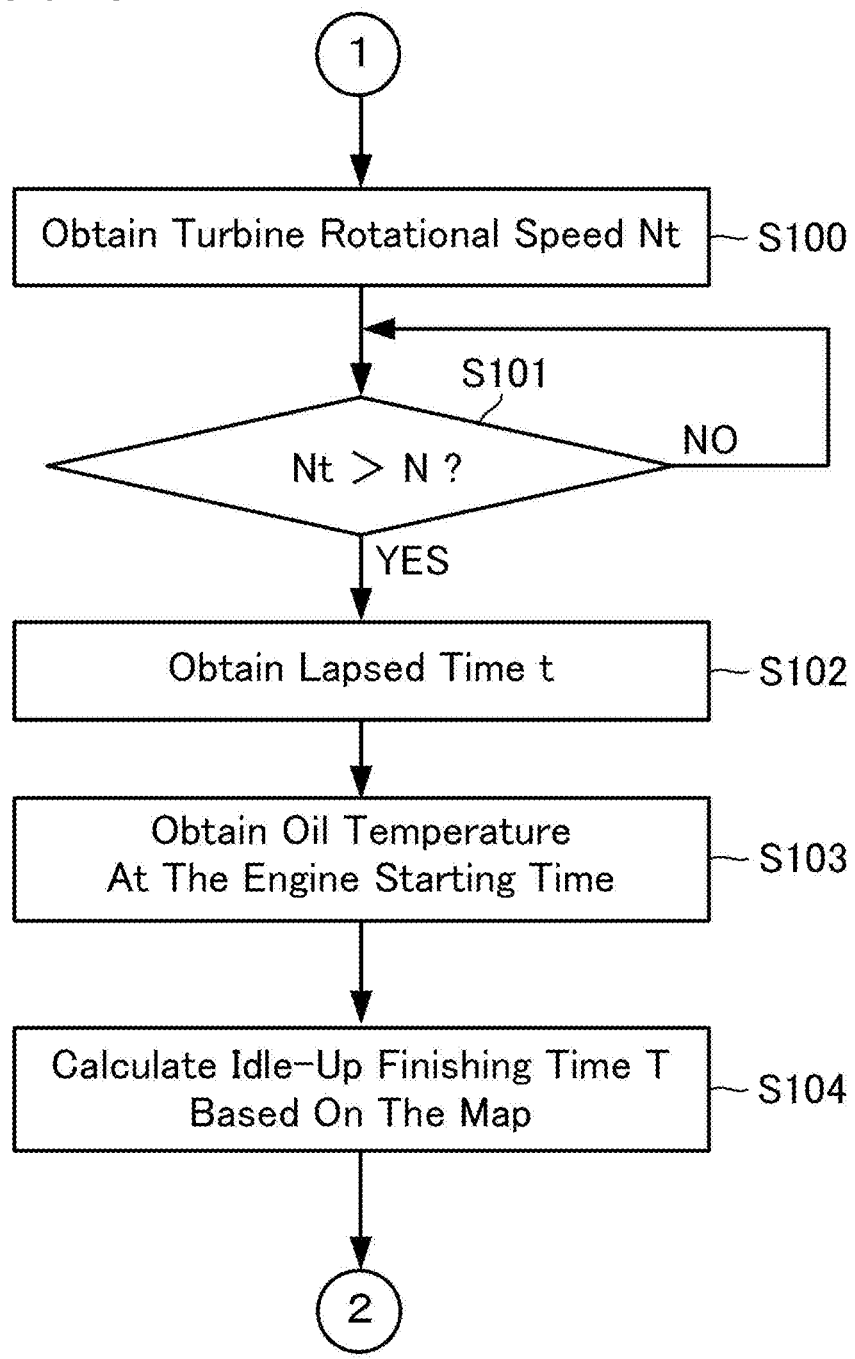
[Fig. 23]

[Fig. 24]
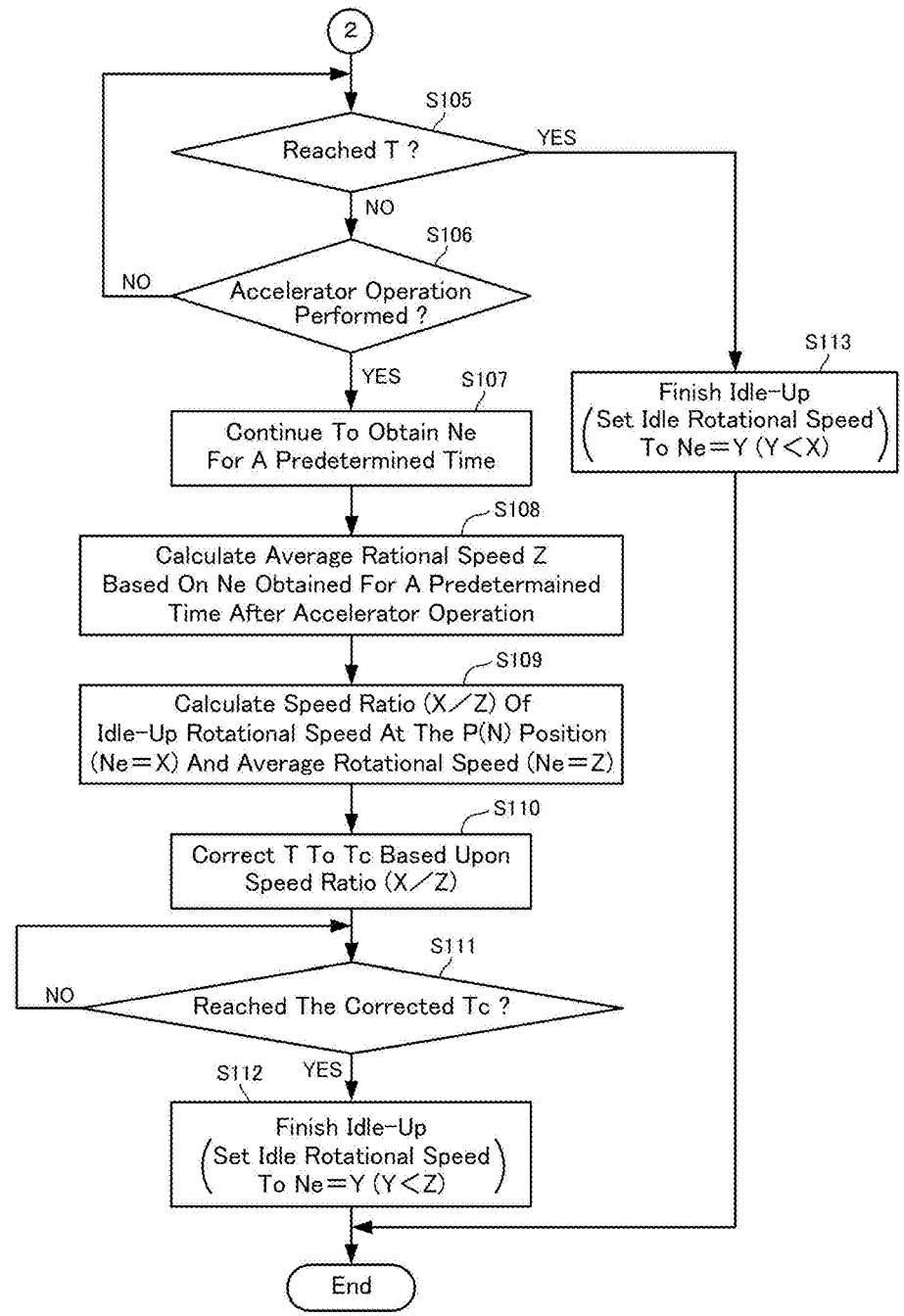

CONTROL APPARATUS OF THE IDLE ROTATION SPEED OF THE INTERNAL COMBUSTION ENGINE OF A VEHICLE WITH AN AUTOMATIC TRANSMISSION AND A TORQUE CONVERTER

TECHNICAL FIELD

The present invention relates to a vehicle control apparatus provided with a power transmission apparatus for transmitting power outputted from a driving source to a transmission mechanism.

BACKGROUND ART

Up until now, there has been known a vehicle control apparatus that controls a lock-up clutch to suppress a power transmission capability from being lowered when the rotational speed of a turbine is not raised, what is called in a lost drive state, by accumulated bubbles in a torque convertor (see for example Patent Document 1).

The conventional vehicle control apparatus is constructed to include a detection unit, a determination unit, and a control unit. The detection unit is adapted to detect the rotational speed of an engine. The determination unit is designed to determine that the state of a torque convertor is in the lost drive state in which the power transmission capability from the engine to a transmission mechanism is lowered in accordance with determination conditions satisfied. The determination conditions of the determination unit include a first condition in which the state of the transmission mechanism takes a condition having the power of the engine transmitted to drive wheels, and a second condition in which the rotational speed of the engine exceeds a standard rotational speed corresponding to the state of the transmission mechanism. The control unit is adapted to control the lock-up clutch to suppress the power transmission capability from being lowered in response to the state of the vehicle when the state of the torque convertor is determined by the determination unit to be in the lost drive state.

CITATION LIST

Patent Literature

Patent Document 1: Japanese Patent Application Publication No. 2010-007815

SUMMARY OF INVENTION

Technical Problem

The conventional vehicle control apparatus as previously mentioned, however, is frequently in the lost drive state at the time of restarting the engine for example in a case that an oil in the torque convertor is discharged due to the vehicle being left in the state of the engine being stopped for a long time. For this reason, the phenomenon that the vehicle starts to move in the idling state of the engine without depressing the accelerator pedal, what is called a creeping, is not properly performed for starting the vehicle, thereby causing a possibility that the starting property is deteriorated. In particular, there is a problem that much time is needed at the restarting time of the vehicle until the restarting operation of the vehicle with the aid of the creeping become available, thereby deteriorating the starting property.

The present invention has been made to solve the problem encountered by the conventional vehicle control apparatus as previously mentioned. It is therefore an object of the present invention to provide a vehicle control apparatus which can improve the power transmission capability after the engine is started, and can suppress the starting capability from being lowered as compared with the conventional vehicle control apparatus.

Solution to Problem

To achieve the above object, the vehicle control apparatus according to the present invention (1) comprises an engine, an automatic transmission connected with the engine, and drive wheels transmitted with the power of the engine through the automatic transmission, the automatic transmission including a torque convertor connected with the engine, a transmission mechanism connected with the torque convertor, the torque convertor having a pump impeller connected with the engine, and a turbine runner connected with the transmission mechanism, the vehicle control apparatus further comprising a rotational speed detection unit that detects the rotational speed of the turbine runner, and a control unit to control the engine to have a rotational speed of the engine raised when a determination condition in which the rotational speed of the turbine runner is not raised even within a standard time lapsed after the engine is started is satisfied.

By the construction as set forth in the above definition, the vehicle control apparatus according to the present invention can determine that the state of the torque convertor is in the lost drive state in which the power transmission capability from the engine to the transmission mechanism is lowered when the rotational speed of the turbine runner is not raised even after the standard time lapses. For this reason, the engine can be controlled to have the rotational speed of the engine raised to the rotational speed higher than the normal idle rotational speed when the state of the torque convertor is determined to be in the lost drive state after the engine is started, thereby making it possible to raise the filling speed of the oil to the torque convertor.

As a consequence, the vehicle control apparatus according to the present invention can transmit the power from the engine to the drive wheels while suppressing the torque convertor from being brought into the lost drive state. Therefore, the vehicle control apparatus according to the present invention can improve the power transmission capability after the engine is started, and can suppress the starting capability from being lowered.

The vehicle control apparatus as set forth in above (1) may preferably (2) further comprise a setting unit that sets a finishing time indicative of a duration until the rotational speed of the engine is returned to a normal idle rotational speed after the rotational speed of the engine is raised, wherein the control unit controlling the engine to have the rotational speed of the engine returned to the normal idle rotational speed after the lapse of the set finishing time, and the setting unit setting the finishing time to shorten the time period to raise the rotational speed of the engine in response to the higher temperature of oil to be supplied to the torque convertor.

By the construction as set forth in the above definition, the vehicle control apparatus according to the present invention can optimally set the finishing time to have the rotational speed of the engine returned to the normal idle rotational speed in response to the temperature (hereinafter simply referred to as the "oil temperature") of the oil to be supplied to the torque convertor even for the cases that the times required to clear the lost drive state are different from one another depending upon the state of the vehicle. More specifically, the vehicle control apparatus according to the present invention can set the finishing time to shorten the time period to raise the rotational speed of the engine in response to the higher oil temperature in consideration that the higher the oil temperature is the lower the viscosity of the oil, thereby causing the filling speed of the oil to the torque convertor to be increased.

As a consequence, the vehicle control apparatus according to the present invention can supply the amount of oil required to have the creep torque to be generated, so that the vehicle control apparatus according to the present invention can optimally set the finishing time in response to the oil temperature. Therefore, the vehicle control apparatus according to the present invention can suppress the generation of the excessive creep torque due to the long time period to raise the rotational speed of the engine, and can suppress the lowering of the power transmission capability due to the short time period to raise the rotational speed of the engine.

The vehicle control apparatus as set forth in above (1) may preferably (3) further comprise a setting unit that sets a finishing time indicative of a duration until the rotational speed of the engine is returned to a normal idle rotational speed after the rotational speed of the engine is raised, wherein the control unit controlling the engine to have the rotational speed of the engine returned to the normal idle rotational speed after lapse of the set finishing time, and the setting unit setting the finishing time to shorten the time period to raise the rotational speed of the engine in response to the shorter time until the rotational speed of the turbine runner reaches a predetermined rotational speed.

By the construction as set forth in the above definition, the vehicle control apparatus according to the present invention can optimally set the finishing time to have the rotational speed of the engine returned to the normal idle rotational speed in response to the time required for the rotational speed of the turbine runner to reach a predetermined rotational speed (hereinafter simply referred to as a "reaching time") even for the cases that the times required to clear the lost drive state are different from one another depending upon the state of the vehicle. More specifically, the vehicle control apparatus according to the present invention can set the finishing time to shorten the time period to raise the rotational speed of the engine in response to the shorter reaching time in consideration that the shorter the reaching time is the shorter the time required to have the state of the torque convertor returned to the state in which the creep torque is generated.

As a consequence, the vehicle control apparatus according to the present invention can supply to the torque convertor the amount of oil required to the time when the creep torque is generated, so that the vehicle control apparatus according to the present invention can optimally set the finishing time in response to the reaching time. Therefore, the vehicle control apparatus according to the present invention can suppress the generation of the excessive creep torque due to the long time period to raise the rotational speed of the engine, and can suppress the lowering of the power transmission capability due to the short time period to raise the rotational speed of the engine.

The vehicle control apparatus as set forth in above (1)-(3) may preferably (4) further comprise a position detection unit that detects a position of a shift lever for changing a state of the automatic transmission, and a speed ratio calculation unit that calculates a speed ratio of the rotational speed of the turbine runner and the rotational speed of the engine, wherein the control unit controls the engine to have the rotational speed of the engine become another rotational speed smaller than the rotational speed raised at the time of the shift lever taking the non-drive position and larger than a normal idle rotational speed when the speed ratio calculated by the calculation unit is less than a predetermined threshold value in the case that a changing operation from a non-drive position to a drive position of the shift lever is detected by the position detection unit during the control to raise the rotational speed of the engine.

By the construction as set forth in the above definition, the vehicle control apparatus according to the present invention can determine whether or not the lost drive state is cleared in response to the speed ratio calculated by the calculation unit when the change of the shift lever from the non-drive position to the drive position is detected by the position detection unit. Therefore, the vehicle control apparatus according to the present invention can control the engine to have the rotational speed of the engine become another rotational speed when the change of the shift lever from the non-drive position to the drive position is detected by the position detection unit, and the lost drive state is not cleared, so that the vehicle control apparatus according to the present invention can clear the lost drive state, and can diminish the raising amount of the rotational speed of the engine, thereby making it possible to suppress the generation of the excessive creep torque.

The vehicle control apparatus as set forth in above (1)-(4) may preferably (5) be so constructed that the control unit stops the control to have the rotational speed raised when the rotational speed of the turbine runner is not raised even if the predetermined time lapses after the rotational speed of the engine is controlled to be raised.

By the construction as set forth in the above definition, the vehicle control apparatus according to the present invention is adapted to stop the control to raise the rotational speed of the engine when erroneously determining that the torque convertor is in the lost drive state for example by the malfunction of the rotational speed detection unit that detects the rotational speed of the turbine runner, so that the vehicle control apparatus according to the present invention can suppress the generation of the excessive torque not intended by the driver.

The vehicle control apparatus as set forth in above (1)-(5) may preferably (6) further comprise an accelerator detection unit that detects an operation state of an accelerator for adjusting an output of the engine, wherein the setting unit setting the finishing time to make shorter the time period to raise the rotational speed of the engine when the operation of the accelerator performed is detected by the accelerator detection unit than when the operation of the accelerator not performed is detected by the accelerator detection unit while the rotational speed of the engine is being controlled to be increased.

By the construction as set forth in the above definition, the vehicle control apparatus according to the present invention can clear the lost drive state at the early stage by the rotational speed of the engine raised by the accelerator operation even if the torque convertor is in the lost drive state. For this reason, the vehicle control apparatus according to the present invention can optimally set the finishing time and can suppress the unnecessary rotational speed of the engine even if the torque convertor is in the lost drive state, thereby making it possible to suppress the generation of the excessive torque not intended by the driver.

Advantageous Effects of Invention

The present invention is to provide a vehicle control apparatus which can improve the power transmission capability after the engine is started, and can suppress the starting capability from being lowered as compared with the conventional vehicle control apparatus.

BRIEF DESCRIPTION OF DRAWINGS

FIG. 1 is a schematic construction view of a vehicle according to the first embodiment of the present invention.

FIG. 2 is a schematic construction view of a power transmission apparatus according to the first embodiment of the present invention.

FIG. 3 is an operation list of an automatic transmission according to the first embodiment of the present invention.

FIG. 4 is a gate pattern for explaining the operation positions of a shift lever according to the first embodiment of the present invention.

FIG. 5 is a schematic construction view of an ECU according to the first embodiment of the present invention.

FIG. 6 is a standard time map showing the relationship between oil temperature and standard time in the vehicle control apparatus according to the first embodiment of the present invention.

FIG. 7 is a timing chart showing the variations of the rotational speed of the engine and the rotational speed of the turbine in the lost drive state in the vehicle according to the first embodiment of the present invention.

FIG. 8 is a timing chart showing the variations of the rotational speed of the engine and the rotational speed of the turbine at the normal operation time in the vehicle according to the first embodiment of the present invention.

FIG. 9 is a flow chart showing an idle-up control in the vehicle control apparatus according to the first embodiment of the present invention.

FIG. 10 is a map showing the relationship between an arrival time of the rotational speed of the turbine and a finishing time of the idle-up in the vehicle control apparatus according to the second embodiment of the present invention, FIG. 11 is a timing chart showing the variations of the rotational speed of the engine and the rotational speed of the turbine in the lost drive state in the vehicle control apparatus according to the second embodiment of the present invention.

FIG. 12 is a first flow chart showing an idle-up control in the vehicle control apparatus according to the second embodiment of the present invention.

FIG. 13 is a second flow chart showing an idle-up control in the vehicle control apparatus according to the second embodiment of the present invention, FIG. 14 is a map showing the relationship between set speed ratios and oil temperatures in the vehicle control apparatus according to the third embodiment of the present invention.

FIG. 15 is a timing chart showing the variations of the rotational speed of the engine and the rotational speed of the turbine in the state free from the lost drive state in the vehicle control apparatus according to the third embodiment of the present invention.

FIG. 16 is a timing chart showing the variations of the rotational speed of the engine and the rotational speed of the turbine in the lost drive state in the vehicle control apparatus according to the third embodiment of the present invention.

FIG. 17 is a first flow chart showing an idle-up control in the vehicle control apparatus according to the third embodiment of the present invention.

FIG. 18 is a second flow chart showing an idle-up control in the vehicle control apparatus according to the third embodiment of the present invention.

FIG. 19 is a third flow chart showing an idle-up control in the vehicle control apparatus according to the third embodiment of the present invention.

FIG. 20 is a flow chart showing an idle-up control in the vehicle control apparatus according to the fourth embodiment of the present invention.

FIG. 21 is a timing chart showing the variations of the rotational speed of the engine and the rotational speed of the turbine in the lost drive state in the vehicle control apparatus according to the fifth embodiment of the present invention.

FIG. 22 is a first flow chart showing an idle-up control in the vehicle control apparatus according to the fifth embodiment of the present invention.

FIG. 23 is a second flow chart showing an idle-up control in the vehicle control apparatus according to the fifth embodiment of the present invention.

FIG. 24 is a third flow chart showing an idle-up control in the vehicle control apparatus according to the fifth embodiment of the present invention.

DESCRIPTION OF EMBODIMENTS

First Embodiment

The vehicle control apparatus according to the first embodiment of the present invention will be described hereinafter with reference to the drawings. The present embodiment will be explained about the case in which the vehicle control apparatus according to present invention is applied to a front engine rear drive (hereinafter simply referred to as "FR") vehicle with an automatic transmission mounted thereon.

First, the construction of the vehicle control apparatus according to the first embodiment of the present invention will be described hereinafter.

As shown in FIG. 1 and FIG. 2, the vehicle 1 comprises an engine 2 constituting a power source, a torque convertor 3 for increasing the rotational torque outputted from the engine 2, a transmission mechanism 4 for outputting the rotational torque while changing the rotational speed of the output shaft of the torque convertor 3, a differential mechanism 7 inputted with the power outputted from the transmission mechanism 4, drive shafts 8L, 8R respectively constituting drive shafts for transmitting the power transmitted from the differential mechanism 7, and drive wheels 9L, 9R to be rotated with the power transmitted by the drive shafts 8L, 8R to drive the vehicle 1.

The engine 2 is constituted by a known internal combustion engine which is adapted to output the power by burning fuel such as gasoline, light oil, and the like. The torque convertor 3 and the transmission mechanism 4 previously mentioned collectively constitute an automatic transmission 5.

The engine 2 is provided with a throttle valve 32 which is disposed on the downstream portion of an intake air path and electronically controlled to adjust the amount of intake air to be supplied to each of cylinders. The engine 2 is controlled with its output to be varied in response to the throttle opening degree of the throttle valve 32.

The torque convertor 3 is arranged between the engine 2 and the transmission mechanism 4, and has a pump impeller 41 operatively connected with the engine 2, a turbine runner 43 operatively connected with an input shaft 42 forming part of the transmission mechanism 4, and a stator 45 which is prevented from being rotated in one rotational direction by a one-way clutch 44. The pump impeller 41 and the turbine runner 43 are adapted to transmit the power through fluid.

The torque convertor 3 is provided with a lock-up clutch 46 for directly connecting the pump impeller 41 with the turbine runner 43, so that the pump impeller 41 and the turbine runner 43 can be mechanically and directly connected with each other by a hydraulic oil at the high speed travelling time of the vehicle 1, thereby making it possible to enhance the transmission efficiency of the power from the engine 2 to the transmission mechanism 4.

The pump impeller 41 is provided with an oil pump 47 which is of a mechanical type to generate the oil pressure for performing the transmission control of the transmission mechanism 4 and the oil pressure for supplying lubricant oil to the other mechanical elements and parts assembled in the engine 2, the torque convertor 3, and the transmission mechanism 4. The oil to be supplied to the torque convertor 3 is discharged from the oil pump 47 and fed to the torque convertor 3 through a hydraulic control circuit which will become apparent as the description proceeds. This means that the rotational speed of the pump impeller 41 is varied, thereby making it possible to change the oil discharging amount and the oil discharging pressure of the oil pump 47.

The transmission mechanism 4 is shown in FIG. 2 as comprising a first planetary gear device 48 of a double pinion type, a second planetary gear device 49 of a single pinion type, and a third planetary gear device 50 of a single pinion type. The first planetary gear device 48 has a sun gear S1 which is connectable with the input shaft 42 through a clutch C3. The sun gear S1 is connectable with a housing 51 through a one-way clutch F2 and a brake B3, and thus is prevented from being rotated in a direction opposite to the rotation direction of the input shaft 42.

The first planetary gear device 48 further has a carrier CA1 which is connectable with the housing 51 through a brake B1. The carrier CA1 is adapted to be prevented from being rotated in an opposite direction by a one-way clutch F1 provided in parallel with the brake B1.

The first planetary gear device 48 further has a ring gear R1 which is connected with a ring gear R2 forming part of the second planetary gear device 49, and is connectable with the housing 51 through a brake B2. The second planetary gear device 49 has a sun gear S2 which is connected with a sun gear S3 forming part of the third planetary gear device 50, and is connectable with the input shaft 42 through a clutch C4. The sun gear S2 is connectable with the input shaft 42 through a one-way clutch F4 and a clutch C1, and is adapted to be prevented from being rotated in an opposite direction by the one-way clutch F4 and the clutch C1.

The second planetary gear device 49 further has a carrier CA2 which is connected with a ring gear R3 forming part of the third planetary gear device 50. The carrier CA2 is connectable with the input shaft 42 through a clutch C2, and connectable with the housing 51 through a brake B4. The carrier CA2 is adapted to be prevented from being rotated in an opposite direction by a one-way clutch F3 provided in parallel with the brake B4. The third planetary gear device 50 further has a carrier CA3 which is connected with an output shaft 52.

The clutches C1 to C4 and the brakes B1 to B4 (hereinafter simply referred to as "clutches C" and "brakes B" if not being specifically distinguished) are each constituted by a friction engagement device of a hydraulic type which is operative to be controlled to selectively be engaged or disengaged by hydraulic actuators such as clutches, brakes and the like of a multi-plate type. The clutches C and the brakes B are adapted to selectively take engagement states or disengagement states in response to the energized states or the deenergized states of transmission solenoids S1 to S4, and linear solenoids SLT, SLU respectively forming parts of a hydraulic control circuit 6 or the operation of a hydraulic circuit to be changed by the operation states of manual valves which will be described hereinafter.

Therefore, the transmission mechanism 4 is adapted to take gear stages in response to the combination of the engagement state and the disengagement states of the clutches C and the brakes B as shown in FIG. 3. The transmission mechanism 4 is adapted to take any one of gear states including first to sixth forward gears and one reverse gear.

The vehicle 1 has a hydraulic control circuit 6 for hydraulically controlling the torque increase ratio of the torque convertor 3 and the gear stages of the transmission mechanism 4. The hydraulic control circuit 6 has an oil temperature sensor 33 to detect the temperature of oil to be supplied to the transmission solenoids S1 to S4, the linear solenoids SLT, SLU, and the torque convertor 3.

The oil temperature sensor 33 is constituted for example by a thermistor having a resistance value to be varied in response to the temperature of the oil to output an oil temperature signal indicative of the resistance value varied in response to the temperature of the oil to an Engine Electronic Control Unit (hereinafter simply referred to as an "engine ECU") 11 which will be described hereinafter.

The vehicle 1 further has an engine rotational speed sensor 21 for detecting the rotational speed Ne of the engine 2, an intake air amount sensor 22 for detecting the intake air amount of the engine 2, an intake air temperature sensor 23 for detecting the temperature of the air to be sucked into the engine 2, a throttle sensor 24 for detecting the opening degree of a throttle valve 32, an input shaft rotational speed sensor 25 for detecting the rotational speed of an input shaft 42 forming part of the transmission mechanism 4, an output shaft rotational speed sensor 26 for detecting the rotational speed of an output shaft 52 forming part of the transmission mechanism 4, a brake sensor 27 for detecting the depression force of a brake pedal, a shift lever 28, an operation position sensor 29 for detecting the operation positions of the shift lever 28, an accelerator pedal 30, an accelerator opening degree sensor 31 for detecting the accelerator opening degree indicative of the positions of the accelerator pedal 30, and a start switch 35.

The operation position sensor 29 is adapted to detect the positions of the shift lever 28 to change the states of the automatic transmission 5, and thus constitutes a position detection unit as defined in the present invention. The accelerator opening degree sensor 31 is adapted to detect the operation states of the accelerator pedal 30 to adjust the output of the engine 2, and thus constitutes an accelerator detection unit as defined in the present invention.

The engine rotational speed sensor 21 is adapted to detect the rotational speed Ne of the engine 2 in accordance with the rotation of the crankshaft not shown and output a signal indicative of the engine rotational speed Ne to the engine ECU 11 which will be described hereinafter.

The throttle sensor 24 is constituted for example by a Hall element which can obtain an output voltage in response to the throttle opening degree of the throttle valve 32 and output a signal indicative of the throttle opening degree to the engine ECU 11 which will be described hereinafter. This means that the engine ECU 11 is adapted to control the throttle opening degree of the throttle valve 32 in accordance with the signal obtained from the throttle sensor 24 and the signal obtained from the engine rotational speed sensor 21, thereby making it possible to control the rotational speed of the engine 2 including an idle rotational speed to become a target rotational speed which will be described hereinafter.

The input shaft rotational speed sensor 25 is adapted to output a signal indicative of the rotational speed of the input shaft 42 of the transmission mechanism 4 to the engine ECU 11 which will be described hereinafter. The input shaft 42 of the transmission mechanism 4 is connected with the turbine runner 43 of the torque convertor 3, and thus functions as an output shaft forming part of the torque convertor 3 as shown in FIG. 2. The input shaft rotational speed sensor 25 is adapted to detect the rotational speed Nt of the turbine runner 43, and thus constitutes a rotational speed detection unit as defined in the present invention. For convenience of explanation, the following description will be made with the rotational speed Nt of the turbine runner 43 being referred to as a turbine rotational speed Nt.

The output shaft rotational speed sensor 26 is adapted to output a signal indicative of the rotational speed of the output shaft 52 of the transmission mechanism 4 to the engine ECU 11 as explained hereinafter. The engine ECU 11 is adapted to calculate a vehicle speed in accordance with the signal indicative of the rotational speed of the output shaft 52.

The brake sensor 27 is adapted to detect the varied hydraulic pressure and the operation stroke of the master cylinder in response to the operation pedal force to the brake pedal by the driver, and to output a brake signal indicative of the detected pedal force to the engine ECU 11 as explained hereinafter.

The operation position sensor 29 is adapted to detect the operation position of the shift lever 28 to be operated by the driver, and to output a shift position signal indicative of the detected shift operation position to the engine ECU 11 which will be described hereinafter.

The accelerator opening degree sensor 31 is constituted for example by an electronic position sensor with a Hall element, and adapted to output a signal indicative of the accelerator opening degree, i.e., the operation position of the accelerator pedal 30 in response to the operation of the accelerator pedal 30 by the driver to the engine ECU 11 which will be described hereinafter.

The start switch 35 is constituted by a push type switch. When the "ON" operation is performed, viz., the button is pressed by the driver, the start switch 35 is adapted to output a signal indicative of the "ON" operation performed to the engine ECU 11 which will be described hereinafter. Further, the start switch 35 may be constituted by a key which is operated by being inserted into a key cylinder and then rotated to a predetermined rotation position by the driver.

The engine ECU 11 is connected with the engine rotational speed sensor 21, the intake air amount sensor 22, the intake air temperature sensor 23, the throttle sensor 24, the input shaft rotational speed sensor 25, the output shaft rotational speed sensor 26, the brake sensor 27, the operation position sensor 29, the accelerator opening degree sensor 31, and the oil temperature sensor 33, and thus is inputted with the signals respectively indicative of the engine rotational speed Ne, the intake air amount, the intake air temperature, the throttle opening degree, the turbine rotational speed Nt, the output shaft rotational speed, the brake depression force, the operation position of the shift lever 28, the accelerator opening degree, and the oil temperature.

The engine ECU 11 has an automatic transmission mode in which the gear stages are selected in response to the travel state of the vehicle 1, and a manual transmission mode in which the gear stages are selected in response to the manual operation. Here, the travel state of the vehicle 1 is intended to means the travel speed of the vehicle 1 and the throttle opening degree.

A transmission ECU 12 is adapted to obtain the signal indicative of the gear stages to be shifted from the engine ECU 11, and to be inputted with the signals respectively indicative of the throttle opening degree, the output shaft rotational speed, the input shaft rotational speed, the brake depression force, the operation position of the shift lever 28, and the oil temperature from the throttle sensor 24, the output shaft rotational speed sensor 26, the input shaft rotational speed sensor 25, the brake sensor 27, the operation position sensor 29, and the oil temperature sensor 33. The transmission ECU 12 is adapted to control the hydraulic control circuit 6 to have the torque convertor 3 of the automatic transmission 5 and the gear stages of the transmission mechanism 4 in accordance with the inputted signals therein. The transmission ECU 12 has a ROM and other memories in which programs and others are preliminarily stored to execute its transmission control.

As shown in FIG. 1 and FIG. 2, the engine ECU 11 and the transmission ECU 12 are communicably connected with each other, and are adapted to exchange the data and the control signals necessary for processes to be performed by the engine ECU 11 and the transmission ECU 12. This construction can allow the engine ECU 11 and the transmission ECU 12 to be cooperated with each other to achieve the control the vehicle 1.

The following explanation will be made in the case that the processes to be performed by the engine ECU 11 and the transmission ECU 12 are comprehensively performed by an ECU 10 which will be described hereinafter.

The vehicle 1 is provided with an Electronic Control Unit (hereinafter simply referred to as an "ECU") 10 which is constituted by the engine ECU 11 and the transmission ECU 12. The ECU 10 is adapted to control the engine 2 and the automatic transmission 5 through the hydraulic control circuit 6 in accordance with a shift map indicative of a shift diagram preliminarily memorized in a Read Only Memory (hereinafter simply referred to as a "ROM") and the like, a map indicative of a standard time set in response to the oil temperature, a program for executing the transmission control, a program for executing an idle-up control, and the like.

According to the present invention, the ECU 10 may further include other ECUs not shown such as for example a brake ECU for controlling the brake of the vehicle 1, a battery ECU for controlling the charging and discharging of the battery mounted on the vehicle 1, and the like.

As shown in FIG. 4, the shift lever 28 is adapted to selectively take a D-position corresponding to a drive range, an N-position corresponding to a neutral range, an Imposition corresponding to a reverse range, and a P-position corresponding to a parking range, from the rear to the forward of the vehicle 1, and to have the positions shifted in compliance with a gate pattern.

The shift lever 28 is further adapted in its manual transmission mode to selectively take an S-position indicative of a manual position for shifting the shift range of the automatic transmission 5, a plus position (+position) for instructing the shift-up, and a minus position (−position) for instructing the shift-down. The S-position is juxtaposed with the D-position, and is retained at the S-position by a spring not shown when the shift lever 28 is laterally moved from the D-position by the driver.

The ECU 10 is adapted to have the shift lever 28 selectively moved to the plus position or the minus position, thereby realizing sequential shifts including a one up-shift range and a one down-shift range from the current shift range. When the shift lever 28 is instructed to selectively be moved to the plus position or the minus position and thereby to selectively take a shift-up or a shift-down, the engine ECU 10 is adapted to execute a range hold to perform the up or down of the shift range.

The ECU 10 is adapted to have the vehicle 1 shifted to the automatic transmission mode in which the gear stages of the automatic transmission 5 are shifted through the hydraulic control circuit 6 in accordance with the vehicle speed, the throttle opening degree, and the shift map when the shift lever 28 positioned at the D-position is detected by the operation position sensor 29. The ECU 10 is further adapted to have the vehicle 1 shifted to the manual transmission mode in which the gear stages of the automatic transmission 5 are shifted in response to the shift range instructed by the driver when the shift lever 28 positioned at the S-position is detected by the operation position sensor 29.

The ECU 10 constitutes a part of the vehicle control apparatus of the vehicle 1 according to the present embodiment, and is shown in FIG. 5 to have a Central Processing Unit (hereinafter simply referred to as a "CPU") 61, a Read Only Memory (hereinafter simply referred to as a "ROM") 62 for memorizing read-only data, a Random Access Memory (hereinafter simply referred to as a "RAM") 63 for temporally memorizing data, a backup memory 64 constituted by a rewritable nonvolatile memory, an input interface 65, and an output interface 66. The CPU 61, the ROM 62, the RAM 63, the backup memory 64, the input interface 65, and the output interface 66 are communicably connected with one another through a bidirectional bus 67.

The ROM 62 of the ECU 10 is adapted to preliminarily store data such as programs for defining the processes of the transmission control, the idle-up control, and the like, and maps to be referred when executing the above programs. The data of the programs and the maps may be stored in the backup memory 64.

The ECU 10 is adapted to control the engine 2 to raise the rotational speed of the engine 2 when the rotational speed of the turbine runner 43 is determined not to be raised even after the standard time lapses from the time when the engine 2 is stated. Therefore, the ECU 10 constitutes a control unit as defined in the present invention.

To be more specific, the vehicle 1 having the vehicle control apparatus according to the present embodiment mounted thereon sometimes temporally encounters such a state, what is called a lost drive state in which the vehicle 1 cannot start moving with the accelerator degree being zero or remaining in the low opening degree state when the shift lever 28 is shifted to the D-position or the R-position immediately after the engine is started, after the vehicle is being parked for a long period of time, for example, one week to 10 days.

The cause of the lost drive state as caused in the above state is due to the fact that the oil in the torque convertor 3 is discharged and partly replaced by the air for example resulting from the long time parking, thereby slowing the rise of the turbine rotational speed Nt because of no sufficient amount of oil left in the torque convertor 3 even when the shift lever 28 is shifted to the D-position or the R-position immediately after the engine is started. This means that there is possibly caused a case in which the power can sufficiently be transmitted from the engine 2 to the transmission mechanism 4. Further, it takes a relatively long time, for example, a few seconds until the torque convertor 3 is filled therein with the oil for the vehicle 1 to be able to start moving with a creep torque generated.

In view of the above fact, with a focus to the fact that the time required for the turbine rotational speed Nt to rise from the engine starting time in the lost drive state, viz., the time required for the turbine rotational speed Nt to become more than zero becomes longer than the time required in the normal time, i.e., not in the lost drive state, the ECU 10 is adapted to determine that the state of the torque convertor 3 is a lost drive state in which the power transmission capability from the engine 2 to the transmission mechanism 4 is lowered when the turbine rotational speed Nt does not rise even after the standard time T1 lapses from the start of the engine 2.

The ECU 10 is therefore adapted to control the engine 2 to have the engine rotational speed Ne rise to a first idle rotational speed X (for example 1200 rpm) higher than a normal idle rotational speed Y (for example 600 rpm) when the ECU 10 determines that the torque convertor 3 is in the lost drive state after the engine starting time as shown in FIG. 7. Further, the engine ECU 10 is adapted to finish raising the engine rotational speed Ne, i.e., an idle-up operation after a predetermined time lapses from the engine starting time.

As will be understood from the foregoing description, the ECU 10 is adapted to perform the idle-up operation when determining that the torque convertor 3 is in the lost drive state after the engine starting time, and to raise an oil filling speed to supply the oil into the torque convertor 3 to sufficiently transmit the power from the engine 2 to the transmission mechanism 4, thereby making it possible to suppress the starting property of the vehicle 1 from being lowered.

On the other hand, the ECU 10 is adapted to determine that the torque convertor 3 is not in the lost drive state and that the idle-up operation is not necessary when the turbine rotational speed Nt rises to more than zero after the standard time T1 lapses from the engine starting time. In this case, the ECU 10 is adapted to control the engine 2 to have the engine rotational speed Ne become a normal idle rotational speed Y as shown in FIG. 8.

Further, the ECU 10 is required to promptly determine whether or not the torque convertor 3 is in the lost drive state after the engine 2 is started. From this fact, the ECU 10 uses a determination standard whether or not the turbine rotational speed Nt is zero after the standard time T1 lapses from the engine 2 starting time.

Further, the ECU 10 is adapted to calculate the standard time T1 in accordance with the standard time map indicative of the standard time for every oil temperature of the oil in the oil pump 47 and the signal indicative of the oil temperature outputted from the oil temperature sensor 33. The standard time map is preliminarily defined through various experiments and preliminarily stored in the ROM 62 and the like.

As shown in the standard time map of FIG. 6, the standard time T1 is set with T1=100 ms for the temperature in the range from 0° C. to 40° C. and with T1=250 ms for the temperature of 60° C. The reason of the standard time T1 thus set is due to the fact that the high oil temperature causes the viscosity of the oil to be lowered, thereby slowing the rise of the turbine rotational speed Nt. For suppressing the erroneous determination on whether or not the idle-up operation is performed, the standard time T1 for the temperature of 60° C. is set to be longer than the standard time T1 for the temperature in the range from 0° C. to 40° C.

The target engine rotational speed serving as the first idle rotational speed X is set at about two times the normal idle rotational speed Y due to the fact that the lost drive state is required to be cleared at least within a predetermined time from the time when engine 2 is started. The predetermined time is preferably set for example at three seconds in consideration of the time for determination of the lost drive state at the starting time of the vehicle 1 and the time for operation by the user of the vehicle 1.

The following explanation is directed to the idle-up control according to the first embodiment with reference to FIG. 9. The following processes can be realized by the program preliminarily memorized in the ROM 62 and the like of the ECU 10, and is executed by the CPU 61 of the ECU 10 at a predetermined time interval.

As shown in FIG. 9, the ECU 10 determines whether or not the "ON" operation of the start switch 35 is performed by the driver in the P-position state of the shift lever 28 during the stoppage of the vehicle 1 (Step S11). When the ECU 10 determines that the "ON" operation of the start switch 35 is not performed ("NO" in Step S11), the process in Step S11 is repeated until the "ON" operation of the start switch 35 is performed.

When, on the other hand, the ECU 10 determines that the "ON" operation of the start switch 35 is performed ("YES" in Step S11), the engine 2 is started (Step S12). The engine 2 thus started causes the rotational speed of the engine 2 to begin rising. Further, the ECU 10 obtains the information indicative of the oil temperature from the oil temperature sensor 33 at the engine starting time to temporally store the data of the oil temperature in the RAM 63.

The ECU 10 then determines whether the engine rotational speed Ne reaches or does not reach the predetermined rotational speed, for example, 350 rpm or over (Step S13). When the ECU 10 determines that the engine rotational speed Ne does not reach 350 rpm or over ("NO" in Step S13), the process in Step S13 is repeated until the engine rotational speed Ne reaches 350 rpm or over.

When, on the other hand, the ECU 10 determines that the engine rotational speed Ne reaches 350 rpm or over ("YES" in Step S13), the process moves to Step S14 in which the timer is activated to begin measuring the lapsed time t of the timer. More specifically, the ECU 10 is operated to have the engine start flag brought into the "ON" state at the time when the engine rotational speed Ne reaches 350 rpm or over, and to begin measuring the lapsed time t of the timer from the above time.

The ECU 10 then obtains the signal indicative of the lapsed time t from the timer to determine whether the lapsed time t reaches or does not reach the standard time T1 or over (Step S15). The standard time T1 to become a determination standard is set in accordance with the standard time map, and the oil temperature data stored in the RAM 63. When the ECU 10 determines that the lapsed time t does not reach the standard time T1 or over ("NO" in Step S15), the process in Step S15 is repeated until the lapsed time t reaches the standard time T1 or over.

When, on the other hand, the ECU 10 determines that the lapsed time t reaches the standard time T1 or over ("YES" in Step S15), the process is moved to Step S16 in which the ECU 10 obtains the signal indicative of the turbine rotational speed Nt from the input shaft rotational speed sensor 25.

The ECU 10 then determines whether the turbine rotational speed Nt thus obtained rises or does not rise, viz., whether or not the turbine rotational speed Nt is zero (Step S 17). When the ECU 10 determines that the turbine rotational speed Nt does not rise ("YES" in Step S 17), the ECU 10 determines that the state of the torque convertor 3 is in the lost drive state, and performs the idle-up operation (Step S18).

More specifically, the ECU 10 determines that the state of the torque convertor 3 is in the lost drive state when the turbine rotational speed Nt is zero at the time when the standard time T1 lapses to control the engine 2 to have the engine rotational speed Ne brought into the idle-up state in which the first idle rotational speed X (for example 1200 rpm) is higher than the normal idle rotational speed Y (for example 600 rpm). Thereafter, the ECU 10 finishes the present process.

When, on the other hand, the ECU 10 determines that the turbine rotational speed Nt rise, viz., the turbine rotational speed Nt is more than zero ("NO" in Step S 17), the ECU 10 determines that the state of the torque convertor 3 is not in the lost drive state, and does not perform the idle-up operation (Step S19).

More specifically, the ECU 10 determines that the idle-up operation is not required when the turbine rotational speed Nt is more than zero at the time when the standard time T1 lapses to control the engine 2 to maintain the normal idle rotational speed Y as shown in FIG. 8. Thereafter, the ECU 10 finishes the present process.

FIG. 7 is a view showing the engine rotational speed Ne and the turbine rotational speed Nt varied after the engine starting time in the state in which the vehicle according to the present embodiment remains in the lost drive state. The engine rotational speed Ne is shown by a solid line 81, while the turbine rotational speed Nt is shown by a solid line 82. The engine rotational speed Ne, as shown by the solid line 81, temporally exceeds the idle rotational speed Y after the engine is started, however, thereafter is maintained at the normal idle rotational speed. In contrast, the turbine rotational speed Nt, as shown by the solid line 82, is maintained at zero at the standard time T1, so that the ECU 10 is operated to execute the idle-up operation. For this reason, the fact that the engine rotational speed Ne rises to the idle rotational speed X higher than the normal idle rotational speed as shown by the solid line 81, leading to the fact that the turbine rotational speed Nt begins gradually rising as shown by the solid line 82. From the foregoing description, it will be understood that the execution of the idle-up operation causes the lost drive state to be cleared at the early stage.

On the other hand, FIG. 8 is a view showing the engine rotational speed Ne and the turbine rotational speed Nt varied after the engine starting time in the state in which the vehicle according to the present embodiment is not in the lost drive state. The engine rotational speed Ne is shown by a solid line 83, while the turbine rotational speed Nt is shown by a solid line 84. The engine rotational speed Ne, as shown by the solid line 83, temporally exceeds the idle rotational speed Y after the engine is started, however, thereafter is maintained at the normal idle rotational speed. In contrast, the turbine rotational speed Nt, as shown by the solid line 84, begins rising immediately after the engine 2 is started, viz., before the standard time lapses, resulting from the fact that the vehicle is not in the lost drive state. For this reason, the ECU 10 is not operated to execute the idle-up operation because the turbine rotational speed Nt is not zero at the standard time T1. Even if the idle-up operation is not executed by the ECU 10 as in the above process, the oil is filled in the torque convertor 3, so that the turbine rotational speed Nt can approach the engine rotational speed Ne at the early stage.

As previously mentioned, the vehicle control apparatus according to the present embodiment can determine that the state of the torque convertor 3 is in the lost drive state in which the power transmission capability to the transmission mechanism 4 from the engine 2 is lowered when the turbine rotational speed Nt does not rise even when the predetermined standard time T1 lapses after the engine is started. For this reason, the ECU 10 can control the engine 2 to have the engine rotational speed Ne raised to the first idle rotational speed X higher than the normal idle rotational speed Y when the ECU 10 determines that the state of the torque convertor 3 is in the lost drive state after the engine is started, thereby making it possible to speed up the filling of the oil into the torque convertor 3.

The above construction can transmit the power from the engine 2 to the drive wheels 9L, 9R through the torque convertor 3 and the transmission mechanism 4, thereby making it possible to suppress the lost drive state. The vehicle control apparatus according to the present invention can improve the power transmission capability after the engine is started, thereby making it possible to suppress the starting capability of the vehicle as compared with the conventional vehicle control apparatus.

Further, the time to finish the idle-up operation may be set as seen in the second embodiment of the vehicle control apparatus which will be described hereinafter according to the present invention.

Second Embodiment

The construction of the vehicle according to the second embodiment of the present invention is almost the same as that of the vehicle according to the first embodiment of the present invention which has been explained with reference to FIGS. 1 to 6 as previously mentioned. Therefore, the elements and parts constituting the vehicle according to the second embodiment of the present invention which are the same as those of the vehicle according to the first embodiment of the present invention bears the reference numerals as those of the vehicle according to the first embodiment of the present invention, and will not be described hereinafter. But the specific construction of the vehicle according to the second embodiment of the present invention will be described hereinafter.

The ECU 10 constituting a part of the vehicle control apparatus according to the present embodiment is adapted to set a finishing time to be returned to the normal idle rotational speed after the rotational speed of the engine 2 is raised. Further, the ECU 10 is adapted to control the engine 2 to have its rotational speed to be returned to the normal idle rotational speed after the finishing time thus set lapses, and to set the finishing time to make short the time period of raising the rotational speed of the engine 2 in response to the higher oil temperature of the oil to be supplied to the torque convertor 3. Further, the ECU 10 may set the finishing time to make short the time period of raising the rotational speed of the engine 2 in response to the short period until the rotational speed of the turbine runner 43 reaches the predetermined rotational speed. Here, the ECU 10 constitutes a setting unit as defined in the present invention.

More specifically, the vehicle 1 sometimes encounters such a state in which the drive force to be transmitted to the transmission mechanism 4 from the engine 2 lacks, thereby causing the starting capability to be lowered when the ECU 10 has finished the idle-up operation in spite of for example the lost drive state being recovered after the ECU 10 executes the idle-up operation. When the shift lever 28 is shifted from the P(N)-position to the D(R)-position in the state in which the idle-up operation is continued in spite of the lost drive state recovered, thereby generating an excessive creep torque and thus causing a possibility that the driver feels the vehicle 1 abruptly moves. Here, the expression "from the P(N)-position to the D(R)-position" is intended to mean four shift operations "from the P-position to the D-position", "from the P-position to the R-position", "from the N-position to the D-position", and "from the reposition to the R-position", viz., all shift operations to be changed from the non-drive positions to the drive positions.

The above operations are needed since the oil discharged from the torque convertor 3 is varied depending upon the conditions such as the parking time, the oil temperature, the outside temperature and the like. This means that when the amount of the oil discharged from the torque convertor 3 is increased for example, it makes a longer time required to fill the oil into the torque convertor 3 at the starting time of the engine 2. This makes the time longer to have the turbine rotational speed Nt reach the predetermined rotational speed, thereby causing the time to recover the lost drive state to be longer.

In view of the above fact, the ECU 10 in the second embodiment focuses the fact that the recovery time of the lost drive state is varied in response to the amount of oil discharged from the torque convertor 3, so that the ECU 10 is adapted to optimally set the idle-up finishing time in response to the amount of oil discharged from the torque convertor 3.

The ROM 62 or the like of the ECU 10 according to the second embodiment has an experimentally produced map preliminarily stored therein. The map is shown in FIG. 10 to be represented by a map showing the relationship between a reaching time Ta (s) required for the turbine rotational speed Nt to reach the predetermined rotational speed N after the engine is started and the idle-up finishing time T.

As previously mentioned in the above, the oil has such a temperature characteristic that the higher the oil temperature is the lower its viscosity. For this reason, when the oil is filled into the torque convertor 3 at a high speed, thereby shortening the time required to have the turbine rotational speed Nt reach the predetermined rotational speed N, the idle-up finishing time T is shortened in response to the shortened time of the turbine rotational speed Nt reaching the predetermined rotational speed N. In consideration of the above fact, the map preliminarily stored in the ROM 62 or the like is shown in FIG. 10 to have the idle-up finishing time T set to be shortened in response to the oil temperature higher toward 20° C., 30° C.~40° C., 60° C.

As previously mentioned in the above, the ECU 10 in the second embodiment is adapted to set an optimum idle-up finishing time T in response to the oil temperature and the turbine rotational speed Nt reaching the predetermined rotational speed N with reference to the map stored in the ROM 62 or the like. The ECU 10 is adapted, as shown in FIG. 11, to control the engine 2 to have the engine rotational speed Ne raised to the first idle rotational speed X returned to the normal idle rotational speed Y when the idle-up finishing time T thus set is reached after the idle-up operation is performed.

The fact that the ECU 10 is adapted to set the optimum idle-up finishing time T after the idle-up operation is performed as previously mentioned, leads to the fact that the vehicle control apparatus according to the second embodiment can suppress the generation of the excessive creep torque due to the long period of increasing the engine rotational speed Ne, and the lowering of the power transmission capability due to the short period of increasing the engine rotational speed Ne.

The idle-up finishing control according to the second embodiment will hereinafter be described with reference to FIG. 12 and FIG. 13. The processes to be explained hereinafter are realized by the programs preliminarily memorized in the ROM 62 or the like of the ECU 10, and are executed at predetermined time intervals by the CPU 61 of the ECU 10.

As shown in FIG. 12, the ECU 10 first determines whether or not the "ON" operation of the start switch 35 is performed by the driver in the state of the shift lever 28 taking the P-position during the stoppage of the vehicle 1 (Step S21). When the ECU 10 determines that the "ON" operation of the start switch 35 is not performed ("NO" in Step S21), the process in Step S21 is repeated until the "ON" operation of the start switch 35 is performed.

When, on the other hand, the ECU 10 determines that the "ON" operation of the start switch 35 is performed ("YES" in Step S21), the engine 2 is started (Step S22). The rotational speed Ne of the engine 2 then begins to be raised. The ECU 10 obtains the signal indicative of the oil temperature from the oil temperature sensor 33 at the engine starting time to temporally store the data of the oil temperature thus obtained in the RAM 63.

The ECU 10 then determines whether the engine rotational speed Ne reaches or does not reach the predetermined rotational speed, for example, 350 rpm or over (Step S23). When the ECU 10 determines that the engine rotational speed Ne does not reach 350 rpm or over ("NO" in Step S23), the process in Step S23 is repeated until the engine rotational speed Ne reaches 350 rpm or over.

When, on the other hand, the ECU 10 determines that the engine rotational speed Ne reaches 350 rpm or over ("YES" in Step S23), the process is moved to Step S24 in which the timer is activated to begin measuring the lapsed time t of the timer. More specifically, the ECU 10 is operated to have the engine start flag brought into the "ON" state at the time when the engine rotational speed Ne reaches 350 rpm or over, and to begin measuring the lapsed time t of the timer from the above time.

The ECU 10 then obtains the signal indicative of the lapsed time t from the timer to determine whether the lapsed time t reaches or does not reach the standard time T1 or over (Step S25). The standard time T1 to become a determination standard is set in accordance with the above map data stored in the ROM 62 of the ECU 10, and the oil temperature data stored in the RAM 63. When the ECU 10 determines that the lapsed time t does not reach the standard time T1 or over ("NO" in Step S25), the process in Step S25 is repeated until the lapsed time t reaches the standard time T1 or over.

When, on the other hand, the ECU 10 determines that the lapsed time t reaches the standard time T1 or over ("YES" in Step S25), the process is moved to Step S26 in which the ECU 10 obtains the signal indicative of the turbine rotational speed Nt from the input shaft rotational speed sensor 25.

The ECU 10 then determines whether the turbine rotational speed Nt thus obtained rises or does not rise, viz., whether or not the turbine rotational speed Nt is zero (Step S27). When the ECU 10 determines that the turbine rotational speed Nt does not rise ("YES" in Step S27), the ECU 10 determines that the state of the torque convertor 3 is in the lost drive state, and performs the idle-up operation (Step S28).

When, on the other hand, the ECU 10 determines that the turbine rotational speed Nt rises, viz., the turbine rotational speed Nt is more than zero ("NO" in Step S27), the ECU 10 determines that the state of the torque convertor 3 is not in the lost drive state, and does not perform the idle-up operation (Step S29). After the process Step S29 is finished, the ECU 10 finishes the present process.

As shown in FIG. 13, the ECU 10 then obtains the signal indicative of the turbine rotational speed Nt from the input shaft rotational speed sensor 25 (Step S30), and determines whether the turbine rotational speed Nt thus obtained exceeds or does not exceed the predetermined rotational speed N (Step S31). The predetermined rotational speed N to become a determination standard is set to be for example 100 rpm. The reason why the predetermined rotational speed N is set as in the above is due to the fact that the ECU 10 is required to detect as early as possible the state in which the turbine rotational speed Nt is larger than the predetermined rotational speed N, and the fact that the determination error is reduced to a level as small as possible. When the ECU 10 determines that the turbine rotational speed Nt does not exceed the predetermined rotational speed N ("NO" in Step S31), the process in Step S31 is repeated until the turbine rotational speed Nt becomes larger than the predetermined rotational speed N.

When, on the other hand, the ECU 10 determines that the turbine rotational speed Nt exceeds the predetermined rotational speed N ("YES" in Step S31), the process is moved to Step S32, and the ECU 10 obtains from the timer the data of the lapse time t to the current time from the time when the engine rotational speed Ne reaches 350 rpm. Further, ECU 10 obtains the data of the oil temperature at the engine starting time which is obtained by the oil temperature sensor 33 and stored in the RAM 63 in Step S22 (Step S33).

Then, the ECU 10 calculates the idle-up finishing time T with reference to the data of the oil temperature obtained in Step S33, and the above map data preliminarily stored in the ROM 62 or the like (Step S34).

Then, the ECU 10 determines whether the process reaches or does not reach the idle-up finishing time T calculated in Step S33 with reference to the lapse time t obtained in Step S32 (Step S35). When the ECU 10 determines that the process does not reach the idle-up finishing time T ("NO" in Step S35), the process in Step S35 is repeated until the process reaches the idle-up finishing time T.

When, on the other hand, the ECU 10 determines that the process reaches the idle-up finishing time T ("YES" in Step S35), the process is moved to Step S36, and the ECU 10 finishes the idle-up operation. More specifically, the ECU 10 determines that the idle-up operation is not required at the time when the process reaches the idle-up finishing time T, and controls the engine 2 to have the engine rotational speed Ne returned to the normal idle rotational speed Y as shown in FIG. 11. Thereafter, the present process is finished.

FIG. 11 is a view showing the engine rotational speed Ne and the turbine rotational speed Nt varied after the engine starting time in the state in which the vehicle according to the present embodiment remains in the lost drive state. The engine rotational speed Ne is shown by a solid line 85, while the turbine rotational speed Nt is shown by a solid line 86. The engine rotational speed Ne, as shown by the solid line 85, temporally exceeds the idle rotational speed Y after the engine is started, however, thereafter is maintained at the normal idle rotational speed. In contrast, the turbine rotational speed Nt, as shown by the solid line 86, is maintained at zero at the standard time T1, so that the ECU 10 is operated to execute the idle-up operation. For this reason, the fact that the turbine rotational speed Ne rises to the idle rotational speed X higher than the normal idle rotational speed as shown by the solid line 86, leading to the fact that the turbine rotational speed Nt begins gradually rising as shown by the solid line 86. From the foregoing description, it will be understood that the execution of the idle-up operation causes the lost drive state to be cleared at the early stage.

Thereafter, the ECU 10 finishes the process when the idle-up finishing time T lapses, so that the engine rotational speed Ne is returned to the normal idle rotational speed as shown by the solid line 85, while the turbine rotational speed Nt gradually rises as shown by the solid line 86.

As has been explained in the above, the vehicle control apparatus according to the second embodiment can optimally set the idle-up finishing time T when the engine rotational speed Ne is returned to the normal idle rotational speed Y in response to the temperature of the oil supplied to the torque convertor 3 and the reaching time Ta required for the turbine rotational speed Nt to reach the predetermined rotational speed N even in the case that it takes different times to clear the lost drive state in response to the states of the vehicle 1.

More specifically, the oil has such a temperature characteristic that the higher the oil temperature is the lower its viscosity, so that the oil can be filled into the torque convertor 3 at a higher filling speed. The shorter the reaching time Ta is the shorter the time to have the state of the torque convertor 3 returned to the state in which the creep torque is generated. In the consideration of these above facts, the ECU 10 can set the idle-up finishing time T in such a manner that the higher the oil temperature and the shorter the reaching time Ta are shorter the time period to raise the engine rotational speed Ne.

Therefore, the amount of oil necessary to the time when the creep torque is generated can be supplied to the torque convertor, so that the ECU 10 can optimally set the idle-up finishing time T in response to the oil temperature and the reaching time Ta. As a result, the vehicle control apparatus according to the second embodiment can suppress the generation of the excessive creep torque due to the long time to raise the engine rotational speed Ne and the abrupt movement feelings due to the movement of the vehicle, and further can suppress the lack of the drive force and the lowering of the starting capability due to the short period to raise the engine rotational speed Ne.

Third Embodiment

The construction of the vehicle according to the third embodiment of the present invention is almost the same as that of the vehicle according to the first embodiment of the present invention which has been explained with reference to FIGS. 1 to 6 as previously mentioned. Therefore, the elements and parts constituting the vehicle according to the third embodiment of the present invention which are the same as those of the vehicle according to the first embodiment of the present invention bears the reference numerals as those of the vehicle according to the first embodiment of the present invention, and will not be described hereinafter. But the specific construction of the vehicle according to the third embodiment of the present invention will be described hereinafter.

The ECU 10 constituting a part of the vehicle control apparatus according to the present embodiment is adapted to calculate the speed ratio of the rotational speed of the turbine runner 43 and the rotational speed of the engine 2. The ECU 10, therefore, constitutes a calculation unit as defined in the present invention. The ECU 10 is adapted to have the operation position sensor 29 detect the change to the drive position from the non-drive position of the shift lever 28 during the control operation to raise the rotational speed of the engine 2. When the speed ratio of the rotational speed of the turbine runner 43 and the rotational speed of the engine 2 is lower than a predetermined threshold value in the case as previously mentioned, the ECU 10 is adapted to control the engine 2 to have the engine 2 driven to rotate at an additional rotational speed lower than the rotational speed raised at the time when the shift lever 28 takes the non-drive position but larger than the normal idle rotational speed.

The ECU 10 is adapted to have the shift lever 28 shifted from the P(N)-position to the D(R)-position in the time period from the execution of the idle-up operation to the idle-up finishing time T. When the ECU 10 continues the idle-up operation in the case as previously mentioned, the vehicle 1 starts moving at the idle rotational speed higher than the normal idle rotational speed at the D(R)-position of the shift lever 28. At this time, the excessive creep torque is possibly generated if the lost drive state of the torque convertor 3 is cleared. If the ECU 10 finishes the idle-up operation in the lost drive state still remaining of the torque convertor 3 when the shift lever 28 is shifted from the P(N)-position to the D(R)-position, the vehicle 1 is impossible to start moving due to the lack of the drive force.

In view of the above fact, the ECU 10 is adapted to determine whether the torque convertor 3 is in the lost drive state when the shift lever 28 is shifted from the P-position, i.e., the non-drive position to the D-position, i.e., the drive position, and when the shift lever 28 is shifted from the N-position, i.e., the non-drive position to the Imposition, i.e., the drive position.

For determining whether or not the torque convertor 3 is in the lost drive state when the shift lever 28 is shifted from the P(N)-position to the D(R)-position, the ECU 10 is adapted to calculate the speed ratio K of the turbine rotational speed Nt and the engine rotational speed Ne (K=Nt/Ne), and to determine whether the speed ratio K is a set speed ratio A preliminarily defined or over.

FIG. 14 is a map showing the relationship of the set speed ratio A and the oil temperature used for determining the speed ratio K of the turbine rotational speed Nt and the engine rotational speed Ne. The map is prepared in accordance with the various experimental results. The ECU 10 is adapted to have the ROM 62 or the like preliminarily memorize the map showing the relationship of the set speed ratio A and the oil temperature. The ECU 10 is adapted to calculate the set speed ratio A with reference to the map when the ECU 10 obtains the signal indicative of the oil temperature from the oil temperature sensor 33.

More specifically, the set speed ratio A to become a determination standard of the speed ratio K(=Nt/Ne) is shown in the map of FIG. 14 as being set with A=0.49 for the oil temperature of 0° C., A=0.47 for the oil temperature of 20° C., A=0.45 for the oil temperature of 40° C., and A=0.41 for the oil temperature of 60° C.

The map is prepared for example as follows. For every discharged amount (for example 800 cc, 1000 cc, 1200 cc, 1400 cc, 2000 cc) of oil from the torque convertor 3 at every oil temperature (0° C., 20° C., 40° C., 60° C.), the speed ratio at which the vehicle starts moving is actually measured. The speed ratio is determined by subtracting a predetermined value from the above ratio thus measured in consideration of the abrupt movement of the vehicle being prevented. Among the speed ratios thus determined, the minimum speed ratio at every oil temperature is selected. The minimum speed ratio thus selected is defined as a set speed ratio A at every oil temperature.

The ECU 10 is adapted to determine whether or not the lost drive state of the torque convertor 3 is cleared in accordance with the comparison of the set speed ratio A thus defined and the speed ratio K(=Nt/Ne) previously mentioned.

More specifically, the ECU 10 determines that the torque convertor 3 is cleared from the lost drive state when the speed ratio K(=Nt/Ne) is the set speed ratio A or over at the shift operation of the shift lever 28 from the P(N)-position to the D(R)-position. On the other hand, the ECU 10 determines that the torque convertor 3 still remains in the lost drive state when the speed ratio K(=Nt/Ne) is less than the set speed ratio A.

When the ECU 10 determines that the torque convertor 3 is cleared from the lost drive state when the speed ratio K(=Nt/Ne) is the set speed ratio A or over at the shift operation of the shift lever 28 from the P(N)-position to the D(R)-position, the ECU 10 is adapted to finish the idle-up operation as shown in FIG. 15. This means that the ECU 10 is adapted to set the engine rotational speed Ne to the normal idle rotational speed Y (for example 600 rpm) lower than the idle rotational speed X (for example 1200 rpm) at the time before the process reaches the idle-up finishing time T obtained in the above second embodiment.

When, on the other hand, the ECU 10 determines that the torque convertor 3 still remains in the lost drive state at the shift operation of the shift lever 28 from the P(N)-position to the D(R)-position, ECU 10 is adapted to continue the idle operation as shown in FIG. 16, and to set the engine rotational speed Ne to the second idle rotational speed W (for example 800 rpm), i.e., the additional rotational speed lower than the idle-up rotational speed X but higher than the normal idle rotational speed Y. This means that the ECU 10 is adapted to decrease the rising amount of the idle rotational speed when the ECU 10 continues the idle-up operation. The second idle rotational speed W is preliminarily defined through the various experimental results to suppress the excessive creep torque from being generated and to clear the lost drive state in the torque convertor 3 at the early stage.

From the foregoing description, it will be understood that the ECU 10 is adapted to finish the idle-up operation at the time before the original idle-up finishing time T when the lost drive state in the torque convertor 3 is cleared, thereby suppressing the excessive creep torque from being generated. Further, the ECU 10 is adapted to continue the idle-up operation at the second rotational speed W when the lost drive state in the torque convertor 3 is not cleared, thereby clearing the lost drive state and suppressing the starting capability from being lowered, so that the rising amount of the idle rotational speed can be decreased, thereby making it possible to suppress the excessive creep torque from being generated.

The idle-up control according to the third embodiment will hereinafter be described with reference to FIG. 17, FIG. 18, and FIG. 19. The processes to be explained hereinafter are realized by the programs preliminarily memorized in the ROM 62 o t like of the ECU 10, and are executed at predetermined time intervals by the CPU 61 of the ECU 10.

As shown in FIG. 17, the ECU 10 first determines whether or not the "ON" operation of the start switch 35 is performed by the driver in the state of the shift lever 28 taking the P-position during the stoppage of the vehicle 1 (Step S41). When the ECU 10 determines that the "ON" operation of the start switch 35 is not performed ("NO" in Step S41), the process in Step S41 is repeated until the "ON" operation of the start switch 35 is performed.

When, on the other hand, the ECU 10 determines that the "ON" operation of the start switch 35 is performed ("YES" in Step S41), the engine 2 is started (Step S42). The rotational speed Ne of the engine 2 then begins to be raised. The ECU 10 obtains the signal indicative of the oil temperature from the oil temperature sensor 33 at the engine starting time to temporally store the data of the oil temperature thus obtained in the RAM 63.

The ECU 10 then determines whether the engine rotational speed Ne reaches or does not reach the predetermined rotational speed, for example, 350 rpm or over (Step S43). When the ECU 10 determines that the engine rotational speed Ne does not reach 350 rpm or over ("NO" in Step S43), the process in Step S43 is repeated until the engine rotational speed Ne reaches 350 rpm or over.

When, on the other hand, the ECU 10 determines that the engine rotational speed Ne reaches 350 rpm or over ("YES" in Step S43), the process is moved to Step S44 in which the timer is activated to begin measuring the lapsed time t of the timer. More specifically, the ECU 10 is operated to have the engine start flag brought into the "ON" state at the time when the engine rotational speed Ne reaches 350 rpm or over, and to begin measuring the lapsed time t of the timer from the above time.

The ECU 10 then obtains the signal indicative of the lapsed time t from the timer to determine whether the lapsed time t reaches or does not reach the standard time T1 or over (Step S45). The standard time T1 to become a determination standard is set in accordance with the above map data stored in the ROM 62 or the like of the ECU 10, and the oil temperature data stored in the RAM 63. When the ECU 10 determines that the lapsed time t does not reach the standard time T1 or over ("NO" in Step S45), the process in Step S45 is repeated until the lapsed time t reaches the standard time T1 or over.

When, on the other hand, the ECU 10 determines that the lapsed time t reaches the standard time T1 or over ("YES" in Step S45), the process is moved to Step S46 in which the ECU 10 obtains the signal indicative of the turbine rotational speed Nt from the input shaft rotational speed sensor 25.

The ECU 10 then determines whether the turbine rotational speed Nt thus obtained rises or does not rise, viz., whether or not the turbine rotational speed Nt is zero (Step S 47). When the ECU 10 determines that the turbine rotational speed Nt does not rise ("YES" in Step S 47), the ECU 10 determines that the state of the torque convertor 3 is in the lost drive state, and performs the idle-up operation (Step S48).

When, on the other hand, the ECU 10 determines that the turbine rotational speed Nt rise, viz., the turbine rotational speed Nt is more than zero, the ECU 10 determines that the state of the torque convertor 3 is not in the lost drive state, and does not perform the idle-up operation (Step S49). After the process Step S49 is finished, the ECU 10 finishes the present process.

As shown in FIG. 18, the ECU 10 then obtains the signal indicative of the turbine rotational speed Nt from the input shaft rotational speed sensor 25 (Step S50), and determines whether the turbine rotational speed Nt thus obtained exceeds or does not exceed the predetermined rotational speed N (Step S51). The predetermined rotational speed N to become a determination standard is set to be 100 rpm, similarly to the second embodiment previously mentioned. When the ECU 10 determines that the turbine rotational speed Nt does not exceed the predetermined rotational speed N ("NO" in Step S51), the process in Step S51 is repeated until the turbine rotational speed Nt becomes larger than the predetermined rotational speed N.

When, on the other hand, the ECU 10 determines that the turbine rotational speed Nt exceeds the predetermined rotational speed N ("YES" in Step S51), the process is moved to Step S52, and the ECU 10 obtains from the timer the data of the lapse time t to the current time from the time when the engine rotational speed Ne reaches 350 rpm. Further, ECU 10 obtains the data of the oil temperature at the engine starting time which is obtained by the oil temperature sensor 33 and stored in the RAM 63 in Step S42 (Step S53).

Then, the ECU 10 calculates the idle-up finishing time T with reference to the data of the oil temperature obtained in Step S53, and the above map data preliminarily stored in the ROM 62 or the like (Step S54).

As shown in FIG. 19, the ECU 10 then determines whether the process reaches or does not reach the idle-up finishing time T calculated in Step S54 with reference to the data of the lapse time t obtained in Step S52 (Step S55). When the ECU 10 determines that the process reaches the idle-up finishing time T ("YES" in Step S55), the process is moved to Step S62, and the ECU 10 finishes the idle-up operation. More specifically, the ECU 10 determines that the idle-up operation is not required at the time when the process reaches the idle-up finishing time T, and controls the engine 2 to have the engine rotational speed Ne returned to the normal idle rotational speed Y as shown in FIG. 11. Thereafter, the present process is finished.

When, on the other hand, the ECU 10 determines that the process does not reach the idle-up finishing time T ("NO" in Step S55), the process is moved to Step 56, and the ECU 10 determines whether or not the shift lever 28 is shifted by the driver from the P(N)-position to the D(R)-position in accordance with the shift position signal from the operation position sensor 29. When the ECU 10 determines that the shift lever 28 is not shifted from the P(N)-position to the D(R)-position ("NO" in Step S56), the process is returned to Step S55 in which the process is repeated until the process reaches the idle-up finishing time T.

When, on the other hand, the ECU 10 determines that the shift lever 28 is shifted from the P(N)-position to the D(R)-position ("YES" in Step S56), the process is returned to Step S57 in which the ECU 10 obtains the signals indicative of the turbine rotational speed Nt and the engine rotational speed Ne from the input shaft rotational speed sensor 25 and the engine rotational speed sensor 21, respectively, at the shifting time to calculate the speed ratio K(=Nt/Ne).

The ECU 10 then determines whether or not the speed ratio K(=Nt/Ne) thus calculated is less than the set speed ratio A (Step S58). When the ECU 10 determines that the speed ratio K(=Nt/Ne) is not less than the set speed ratio A, viz., the set speed ratio A or over ("NO" in Step S58), the process is moved to Step S62, and finishes the idle-up operation. This means that the ECU 10 determines that the lost drive state in the torque convertor 3 is cleared at the time before the process reaches the idle-up finishing time T, and controls the engine 2 to have the engine rotational speed Ne returned to the normal idle rotational speed Y as shown in FIG. 15. Thereafter, the ECU 10 finishes the present process.

When, on the other hand, the ECU 10 determines that the speed ratio K(=Nt/Ne) is less than the set speed ratio A ("YES" in Step S58), the process is moved to Step S59 in which the ECU 10 continues with the decreased rising amount of the idle rotational speed. This means that the ECU 10 determines the torque convertor 3 still remains in the lost drive state at the time before the process reaches the idle-up finishing time T, and controls the engine 2 to have the engine rotational speed Ne set to the second idle rotational speed W lower than the idle rotational speed X but higher than the normal idle rotational speed Y as shown in FIG. 16.

The ECU 10 then determines whether the speed ratio K(=Nt/Ne) reaches or does not reach the set speed ratio A in response to the rising of the turbine rotational speed Nt (Step S60). When the ECU 10 determines that the speed ratio K(=Nt/Ne) does not reach the set speed ratio A ("NO" in Step S60), the process in Step S60 is repeated until the speed ratio K reaches the set speed ratio A.

When, on the other hand, the ECU 10 determines that the speed ratio K reaches the set speed ratio A ("YES" in Step S60), the process is moved to Step S61 to finish the idle-up operation. This means that that the ECU 10 determines that the lost drive state in the torque convertor 3 is cleared at the time before the process reaches the idle-up finishing time T, and controls the engine 2 to have the engine rotational speed Ne returned to the normal idle rotational speed Y from the second idle rotational speed W lower than the idle rotational speed X as shown in FIG. 16. Thereafter, the ECU 10 finishes the present process.

FIG. 15 is a view showing the engine rotational speed Ne and the turbine rotational speed Nt varied after the engine starting time when the shift lever 28 is shifted from the non-drive position to the drive position in the state in which the vehicle according to the present embodiment remains in the lost drive state. The engine rotational speed Ne is shown by a solid line 87, while the turbine rotational speed Nt is shown by a solid line 88. The speed ratio K is further shown by a solid line 89.

The engine rotational speed Ne, as shown by the solid line 87, temporally exceeds the idle rotational speed Y after the engine is started, however, thereafter is maintained at the normal idle rotational speed. In contrast, the turbine rotational speed Nt, as shown by the solid line 88, is maintained at zero at the standard time T1, so that the ECU 10 is operated to execute the idle-up operation. For this reason, the fact that the engine rotational speed Ne rises to the idle rotational speed X higher than the normal idle rotational speed as shown by the solid line 87, leading to the fact that the turbine rotational speed Nt begins gradually rising as shown by the solid line 88. From the foregoing description, it will be understood that the execution of the idle-up operation causes the lost drive state to be cleared at the early stage. The speed ratio K begins rising concurrently with the rising of the turbine rotational speed Nt.

Here, the ECU 10 determines whether or not the lost drive state in the torque convertor 3 is cleared when the shift lever 28 is shifted from the non-drive position to the drive position during the idle-up operation. At this time, the ECU 10 determines that the lost drive state in the torque convertor 3 is cleared due to the fact that the speed ratio K is the set speed ratio A or over. This means that the engine rotational speed Ne is lowered to the normal idle rotational speed as shown by the solid line 87. The turbine rotational speed Nt is also concurrently lowered as shown by the solid line 88.

FIG. 16 is a view showing the engine rotational speed Ne and the turbine rotational speed Nt varied after the engine starting time when the shift lever 28 is shifted from the non-drive position to the drive position in the state in which the vehicle according to the present embodiment remains in the lost drive state. The engine rotational speed Ne is shown by a solid line 91, while the turbine rotational speed Nt is shown by a solid line 92. The speed ratio K is further shown by a solid line 93.

The engine rotational speed Ne, as shown by the solid line 91, temporally exceeds the idle rotational speed Y after the engine is started, however, thereafter is maintained at the normal idle rotational speed. In contrast, the turbine rotational speed Nt, as shown by the solid line 92, is maintained at zero at the standard time T1, so that the ECU 10 is operated to execute the idle-up operation. For this reason, the fact that the engine rotational speed Ne rises to the idle rotational speed X higher than the normal idle rotational speed as shown by the solid line 91, leading to the fact that the turbine rotational speed Nt begins gradually rising as shown by the solid line 92. From the foregoing description, it will be understood that the execution of the idle-up operation causes the lost drive state to be cleared at the early stage. The speed ratio K begins rising concurrently with the rising of the turbine rotational speed Nt.

Here, the ECU 10 determines whether or not the lost drive state in the torque convertor 3 is cleared when the shift lever 28 is shifted from the non-drive position to the drive position during the idle-up operation. At this time, the ECU 10 determines that the lost drive state in the torque convertor 3 is not cleared due to the fact that the speed ratio K is less than the set speed ratio A as shown by the solid line 93. This means that the engine rotational speed Ne is lowered to the idle rotational speed W higher than the normal idle rotational speed as shown by the solid line 91. Thereafter, the ECU 10 determines that the lost drive state in the torque convertor 3 is cleared due to the fact that the speed ratio K exceeds the set speed ratio A as shown by the solid line 93. Therefore, the engine rotational speed Ne is lowered to the normal idle rotational speed Y as shown by the solid line 91.

From the foregoing description, it will be understood that the ECU 10 can determine whether or not the lost drive state in the torque convertor 3 is cleared in response to the calculated speed ratio K(=Nt/Ne) when the shift from the P(N)-position to the D(R)-position by the shift lever 28 is detected during the idle-up operation in the time period from the execution of the idle-up operation to the idle-up finishing time T.

Therefore, the ECU 10 can control the engine 2 to have the engine rotational speed Ne returned to the second idle rotational speed W, which is lower than the idle rotational speed X and higher than the normal idle rotational speed Y, viz., can control to have the idle-up operation continue when the ECU 10 detects the shift from the P(N)-position to the D(R)-position and determines that the lost drive state in the torque convertor 3 is not cleared, so that the ECU 10 can clear the lost drive state in the torque convertor 3 and can suppress the starting capability from being lowered. Further, the ECU 10 is adapted to control the engine 2 to have the rising amount of the engine rotational speed Ne decreased when the idle-up operation continues, thereby making it possible to suppress the excessive creep torque from being generated.

Further, the ECU 10 is adapted to finish the idle-up operation under a predetermined condition before the original idle-up finishing time T, thereby making it possible to suppress the excessive creep torque from being generated.

Fourth Embodiment

The construction of the vehicle according to the fourth embodiment of the present invention is almost the same as that of the vehicle according to the first embodiment of the present invention which has been explained with reference to FIGS. 1 to 6 as previously mentioned. Therefore, the elements and parts constituting the vehicle according to the fourth embodiment of the present invention which are the same as those of the vehicle according to the first embodiment of the present invention bears the reference numerals as those of the vehicle according to the first embodiment of the present invention, and will not be described hereinafter. But the specific construction of the vehicle according to the fourth embodiment of the present invention will be described hereinafter.

The ECU 10 constituting a part of the vehicle control apparatus according to the present embodiment is adapted to stop the control to have the engine 2 rotational speed raised when the rotational speed of the turbine runner 43 is not raised even with the lapse of the predetermined time T2 after the ECU 10 controls to have the engine 2 rotational speed raised.

The ECU 10 is adapted to perform the idle-up operation when the ECU 10 determines that the torque convertor 3 is in the lost drive state under a predetermined condition. In this case, there is a possibility that the ECU 10 erroneously determines that the torque convertor 3 is in the lost drive state in spite of the fact that the torque convertor 3 is not actually in the lost drive state, for example, resulting from the malfunction of the input shaft rotational speed sensor 25. The erroneous determination by the ECU 10 as previously mention may lead to performing an unrequired idle-up operation, thereby possibly generating the excessive creep torque and deteriorating what is called a garage shift shock.

In view of the above fact, the ECU 10 constituting a part of the vehicle control apparatus of the vehicle 1 according to the fourth embodiment is adapted to stop the idle-up operation when the turbine rotational speed Nt is not raised, viz., is equal to zero within the predetermined time T2 from the engine starting time after the idle-up operation is performed to have the engine rotational speed Ne raised.

The predetermined time T2 is set in consideration of the time required to fill the amount of oil required to have the creep torque generated from the state in which the oil in the torque convertor 3 is discharged to the maximum amount of oil from the torque convertor 3 subject to a structure thereof. The predetermined time T2 is determined depending upon the capacity of the torque convertor 3 and the amount of oil to be supplied to the torque convertor 3 from the oil pump 47 by the hydraulic control circuit 6. The ECU 10 is adapted to preliminarily store the information of the predetermined time T2 in the ROM 62 or the like of the ECU 10.

Further, the predetermined time T2 can take a plurality of value depending upon the oil temperature. In this case, the oil has such a temperature characteristic that the higher the oil temperature is the lower its viscosity. For this reason, the oil is filled into the torque convertor 3 at a high speed, thereby shortening the time required to have the turbine rotational speed Nt reach the predetermined rotational speed N. For this reason, the predetermined time T2 may be set to be shortened in response to the oil temperature higher toward 0° C., 20° C., 40° C., 60° C. for example.

The idle-up control according to the fourth embodiment will hereinafter be described with reference to FIG. 20. The processes to be explained hereinafter are realized by the programs preliminarily memorized in the ROM 62 or the like of the ECU 10, and are executed at predetermined time intervals by the CPU 61 of the ECU 10.

As shown in FIG. 20, the ECU 10 first determines whether or not the "ON" operation of the start switch 35 is performed by the driver in the state of the shift lever 28 taking the P-position during the stoppage of the vehicle 1 (Step S71). When the ECU 10 determines that the "ON" operation of the start switch 35 is not performed ("NO" in Step S71), the process in Step S71 is repeated until the "ON" operation of the start switch 35 is performed.

When, on the other hand, the ECU 10 determines that the "ON" operation of the start switch 35 is performed ("YES" in Step S71), the engine 2 is started (Step S72). The rotational speed Ne of the engine 2 then begins to be raised. The ECU 10 obtains the signal indicative of the oil temperature from the oil temperature sensor 33 at the engine starting time to temporally store the data of the oil temperature thus obtained in the RAM 63.

The ECU 10 then determines whether the engine rotational speed Ne reaches or does not reach the predetermined rotational speed, for example, 350 rpm or over (Step S73). When the ECU 10 determines that the engine rotational speed Ne does not reach 350 rpm or over ("NO" in Step S73), the process in Step S73 is repeated until the engine rotational speed Ne reaches 350 rpm or over.

When, on the other hand, the ECU 10 determines that the engine rotational speed Ne reaches 350 rpm or over ("YES" in Step S73), the process is moved to Step S74 in which the timer is activated to begin measuring the lapsed time t of the timer. More specifically, the ECU 10 is operated to have the engine start flag brought into the "ON" state at the time when the engine rotational speed Ne reaches 350 rpm or over, and to begin measuring the lapsed time t of the timer from the above time.

The ECU 10 then obtains the signal indicative of the lapsed time t from the timer to determine whether the lapsed time t reaches or does not reach the standard time T1 or over (Step S75). The standard time T1 to become a determination standard is set in accordance with the above map data stored in the ROM 62 or the like of the ECU 10, and the oil temperature data stored in the RAM 63. When the ECU 10 determines that the lapsed time t does not reach the standard time T1 or over ("NO" in Step S75), the process in Step S75 is repeated until the lapsed time t reaches the standard time T1 or over.

When, on the other hand, the ECU 10 determines that the lapsed time t reaches the standard time T1 or over ("YES" in Step S75), the process is moved to Step S76 in which the ECU 10 obtains the signal indicative of the turbine rotational speed Nt from the input shaft rotational speed sensor 25.

The ECU 10 then determines whether the turbine rotational speed Nt thus obtained rises or does not rise, viz., whether or not the turbine rotational speed Nt is zero (Step S 77). When the ECU 10 determines that the turbine rotational speed Nt rise, viz., the turbine rotational speed Nt is more than zero ("NO" in Step S 77), the ECU 10 determines that the state of the torque convertor 3 is not in the lost drive state, and does not perform the idle-up operation (Step S79). The ECU 10 finishes Step S79, and thereafter finishes the present process.

When, on the other hand, the ECU 10 determines that the turbine rotational speed Nt does not rise, viz., the turbine rotational speed Nt is equal to zero ("YES" in Step S 77), the ECU 10 determines that the state of the torque convertor 3 is in the lost drive state, and controls the engine 2 to have the engine rotational speed Ne raised to the first idle rotational speed X higher than the normal idle rotational speed Y (Step S78).

The ECU 10 then obtains the signal indicative of the lapsed time t from the timer to determine whether the lapsed time t reaches or does not reach the standard time T2 or over (Step S80). When the ECU 10 determines that the lapsed time t does not reach the standard time T2 or over ("NO" in Step S80), the process in Step S80 is repeated until the lapsed time t reaches the standard time T2 or over.

When, on the other hand, the ECU 10 determines that the lapsed time t reaches the standard time T2 or over ("YES" in Step S80), the process is moved to Step S81 in which the ECU 10 determines whether or not the turbine rotational speed Nt is zero (Step S 81). When the ECU 10 determines that the turbine rotational speed Nt is not zero ("NO" in Step S 81), and continues the idle-up operation (Step S 83). When, on the other hand, the ECU 10 determines that the turbine rotational speed Nt is zero ("YES" in Step S 81), and finishes the idle-up operation. More specifically, the ECU 10 determines that the idle-up operation is not required at the time when the process reaches the idle-up finishing time T2, and controls the engine 2 to have the engine rotational speed Ne returned to the normal idle rotational speed Y. Thereafter, the present process is finished.

From the foregoing description, it will be understood that the ECU 10 constituting a part of the vehicle control apparatus of the vehicle 1 according to the fourth embodiment is adapted to stop the idle-up operation of raising the engine rotational speed Ne when the ECU 10 erroneously determines that the torque convertor 3 is in the lost drive state, for example, resulting from the malfunction of the input shaft rotational speed sensor 25 for detecting the turbine rotational speed Nt, viz., when the turbine rotational speed Nt is not raised within the predetermined time T2 after the execution of the idle-up operation, thereby making it possible to suppress the generation of the excessive creep torque and the deterioration of the garage shift shock which are not intended by the driver.

Fifth Embodiment

The construction of the vehicle according to the fifth embodiment of the present invention is almost the same as that of the vehicle according to the first embodiment of the present invention which has been explained with reference to FIGS. 1 to 6 as previously mentioned. Therefore, the elements and parts constituting the vehicle according to the fifth embodiment of the present invention which are the same as those of the vehicle according to the first embodiment of the present invention bears the reference numerals as those of the vehicle according to the first embodiment of the present invention, and will not be described hereinafter. But the specific construction of the vehicle according to the fifth embodiment of the present invention will be described hereinafter.

The ECU 10 constituting a part of the vehicle control apparatus according to the present embodiment is adapted to set the idle-up finishing time to have the time period of raising the rotational speed of the engine 2 become shorter when the operation of the accelerator pedal 30 being performed is detected by the accelerator sensor 31 than when the operation the accelerator pedal 30 not being performed is detected by the accelerator sensor 31 during the control to have the rotational speed of the engine 2 raised.

The ECU is adapted to perform the idle-up operation when the ECU 10 determines that the torque convertor 3 is in the lost drive state under a predetermined condition. The ECU is adapted to set the optimum idle-up finishing time T, and to finish the idle-up operation after the execution of the idle-up operation. In this case, the lost drive state is rapidly recovered when a racing operation, which is the operation of the accelerator pedal 30, is performed in the time period from the execution of the idle-up operation to the idle-up finishing time T.

This means that when the operation of the accelerator pedal 30 is performed, the rotational speed Ne of the engine 2 is raised. The discharge amount of oil from the oil pump 47 operated by the rotation drive force of the engine 2 having the rotational speed Ne raised is increased, thereby causing the filling speed of the oil supplied to the torque convertor 3 to be increased, so that the lose drive state is more rapidly recovered than the lost drive state maintained when the operation of the accelerator pedal 30 is not performed.

In view of the above fact, the ECU 10 is adapted to set the idle-up finishing time Tc corrected to have shorter the time of the engine rotational speed Ne to be raised when the operation of the accelerator pedal 30 is performed than when the operation of the accelerator pedal 30 is not performed during the idle-up operation.

More specifically, the ECU 10 is, as shown in FIG. 21, adapted to calculate the first idle rotational speed X at the P(N)-position and the average rotational speed of the engine rotational speed Ne, i.e., the average rotational speed Z shown to be raised as an example, in the predetermined time after the operation of the accelerator pedal 30 when the accelerator operation is performed during the idle-up operation to have the engine rotational speed Ne raised to the rotational speed Z higher than the first idle rotational speed X, and to calculate the speed ratio X/Z. The ECU 10 is adapted to set the idle-up finishing time Tc corrected to shorten the idle-up finishing time T in accordance with the speed ratio X/Z. The idle-up finishing time Tc thus corrected can be obtained by the correction equation Tc=T×X/Z.

From the foregoing description, it will be understood that the ECU 10 is adapted to determine that the torque convertor 3 is in the lost drive state to have the accelerator operation performed during the idle-up operation. At this time, the ECU 10 is adapted to correct the idle-up finishing time to shorten the idle-up finishing time in response to the rapid recovery of the lost drive state by the accelerator operation, thereby suppressing the engine rotational speed Ne from being unnecessarily raised, and thereby suppressing the excessive creep torque not intended by the driver from being generated.

The idle-up control according to the fifth embodiment will hereinafter be described with reference to FIG. 22, FIG. 23, and FIG. 24. The processes to be explained hereinafter are realized by the programs preliminarily memorized in the ROM 62 or the like of the ECU 10, and are executed at predetermined time intervals by the CPU 61 of the ECU 10.

As shown in FIG. 22, the ECU 10 first determines whether or not the "ON" operation of the start switch 35 is performed by the driver in the state of the shift lever 28 taking the P-position during the stoppage of the vehicle 1 (Step S91). When the ECU 10 determines that the "ON" operation of the start switch 35 is not performed ("NO" in Step S91), the process in Step S91 is repeated until the "ON" operation of the start switch 35 is performed.

When, on the other hand, the ECU 10 determines that the "ON" operation of the start switch 35 is performed ("YES" in Step S91), the engine 2 is started (Step S92). The rotational speed Ne of the engine 2 then begins to be raised. The ECU 10 obtains the signal indicative of the oil temperature from the oil temperature sensor 33 at the engine starting time to temporally store the data of the oil temperature thus obtained in the RAM 63.

The ECU 10 then determines whether the engine rotational speed Ne reaches or does not reach the predetermined rotational speed, for example, 350 rpm or over (Step S93). When the ECU 10 determines that the engine rotational speed Ne does not reach 350 rpm or over ("NO" in Step S93), the process in Step S93 is repeated until the engine rotational speed Ne reaches 350 rpm or over.

When, on the other hand, the ECU 10 determines that the engine rotational speed Ne reaches 350 rpm or over ("YES" in Step S93), the process is moved to Step S94 in which the timer is activated to begin measuring the lapsed time t of the timer. More specifically, the ECU 10 is operated to have the engine start flag brought into the "ON" state at the time when the engine rotational speed Ne reaches 350 rpm or over, and to begin measuring the lapsed time t of the timer from the above time.

The ECU 10 then obtains the signal indicative of the lapsed time t from the timer to determine whether the lapsed time t reaches or does not reach the standard time T1 or over (Step S95). The standard time T1 to become a determination standard is set in accordance with the above map data stored in the ROM 62 or the like of the ECU 10, and the oil temperature data stored in the RAM 63. When the ECU 10 determines that the lapsed time t does not reach the standard time T1 or over ("NO" in Step S95), the process in Step S95 is repeated until the lapsed time t reaches the standard time T1 or over.

When, on the other hand, the ECU 10 determines that the lapsed time t reaches the standard time T1 or over ("YES" in Step S95), the process is moved to Step S96 in which the ECU 10 obtains the signal indicative of the turbine rotational speed Nt from the input shaft rotational speed sensor 25.

The ECU 10 then determines whether the turbine rotational speed Nt thus obtained rises or does not rise, viz., whether or not the turbine rotational speed Nt is zero (Step S 97). When the ECU 10 determines that the turbine rotational speed Nt does not rise ("YES" in Step S 97), the ECU 10 determines that the state of the torque convertor 3 is in the lost drive state, and performs the idle-up operation (Step S98).

When, on the other hand, the ECU 10 determines that the turbine rotational speed Nt rises, viz., the turbine rotational speed Nt is more than zero ("NO" in Step S 97), the ECU 10 determines that the state of the torque convertor 3 is not in the lost drive state, and does not perform the idle-up operation (Step S99).

As shown in FIG. 23, the ECU 10 then obtains the signal indicative of the turbine rotational speed Nt from the input shaft rotational speed sensor 25 (Step S100), and determines whether the turbine rotational speed Nt thus obtained exceeds or does not exceed the predetermined rotational speed N (Step S101). The predetermined rotational speed N to become a determination standard is set to be 100 rpm, similarly to the second embodiment previously mentioned. When the ECU 10 determines that the turbine rotational speed Nt does not exceed the predetermined rotational speed N ("NO" in Step S101), the process in Step S101 is repeated until the turbine rotational speed Nt becomes larger than the predetermined rotational speed N.

When, on the other hand, the ECU 10 determines that the turbine rotational speed Nt exceeds the predetermined rotational speed N ("YES" in Step S101), the process is moved to Step S102, and the ECU 10 obtains from the timer the data of the lapse time t to the current time from the time when the engine rotational speed Ne reaches 350 rpm. Further, ECU 10 obtains the data of the oil temperature at the engine starting time which is obtained by the oil temperature sensor 33 and stored in the RAM 63 in Step S92 (Step S103).

Then, the ECU 10 calculates the idle-up finishing time T with reference to the data of the oil temperature obtained in Step S103, and the above map data preliminarily stored in the ROM 62 or the like (Step S104).

As shown in FIG. 24, the ECU 10 then determines whether the process reaches or does not reach the idle-up finishing time T calculated in Step S104 with reference to the lapse time t obtained in Step S102 (Step S105). When the ECU 10 determines that the process reaches the idle-up finishing time T ("YES" in Step S105), the process is moved to Step S113, and the ECU 10 finishes the idle-up operation. More specifically, the ECU 10 determines that the idle-up operation is not required at the time when the process reaches the idle-up finishing time T, and controls the engine 2 to have the engine rotational speed Ne returned to the normal idle rotational speed Y from the first idle rotational speed X as shown in FIG. 11. Thereafter, the present process is finished.

When, on the other hand, the ECU 10 determines that the process does not reach the idle-up finishing time T ("NO" in Step S105), the process is moved to Step 106, and the ECU 10 determines whether or not the accelerator operation is performed by the driver. More specifically, the ECU 10 determines whether or not the accelerator pedal 30 is depressed in accordance with the signal indicative of the accelerator degree from the accelerator opening degree sensor 31. When the ECU 10 determines that the accelerator operation is not performed ("NO" in Step S106), the process is returned to Step S105 in which the process is repeated until the process reaches the idle-up finishing time T.

When the ECU 10 determines that the accelerator operation is performed ("YES" in Step S106), the process is moved to Step S107 in which the ECU 10 continues to obtain the signal indicative to the engine rotational speed Ne from the engine rotational speed sensor 21 for a predetermined time. In this case, the accelerator operation is performed during the idle-up operation, so that the engine rotational speed Ne is maintained at the rotational speed Z higher than the first idle rotational speed X as shown in FIG. 21.

The ECU 10 then calculates the average rotational speed of the engine rotational speed Ne obtained for a predetermined time after the accelerator operation, viz., calculates Ne=Z in the example shown in FIG. 21 (Step S108). The ECU 10 then calculates the speed ratio X/Z in accordance with the first idle rotational speed X at the P(N)-position and the average rotational speed Z of the engine rotational speed Ne calculated in Step 108 thus calculated (Step 109).

The ECU 10 then corrects the idle-up finishing time T required for the accelerator operation not performed during the idle-up operation to the idle-up finishing time Tc required for the accelerator operation performed during the idle-up operation, using the speed ratio X/Z thus calculated and the correction equation Tc=T×X/Z (Step S110).

The ECU 10 then determines whether the process reaches or does not reach the idle-up finishing time Tc corrected in Step S110 with reference to the lapse time obtained from the timer, viz., the lapse time to the current time from the time when the engine rotational speed Ne reaches 350 rpm (Step S111). When the ECU 10 determines whether the process does not reach the corrected idle-up finishing time Tc ("NO" in Step S111), the process is repeated until the process reaches the idle-up finishing time Tc.

When, on the other hand, the ECU 10 determines that the process reaches the corrected idle-up finishing time Tc ("YES" in Step S111), the process is moved to Step S112 in which the idle-up operation is finished. More specifically, as shown in FIG. 21, the ECU 10 determines that the idle-up operation is not required at the time when the process reaches the corrected idle-up finishing time Tc earlier than the idle-up finishing time T measured when the accelerator operation is not performed, and controls the engine 2 to have the engine rotational speed Ne returned to the normal idle rotational speed Y from the rotational speed Z higher than the first idle rotational speed X. Thereafter, the present process is finished.

FIG. 21 is a view showing the engine rotational speed Ne and the turbine rotational speed Nt varied after the engine starting time when the operation of accelerator pedal 30 is performed during the idle-up operation in the state in which the vehicle according to the present embodiment remains in the lost drive state. The engine rotational speed Ne is shown by a solid line 94, while the turbine rotational speed Nt is shown by a solid line 95. The engine rotational speed Ne, as shown by the solid line 94, temporally exceeds the idle rotational speed Y after the engine is started, however, thereafter is raised to the engine rotational speed Z higher than the idle rotational speed X when the operation of the accelerator pedal 30 is performed as shown by the solid line 94. For this reason, the lost drive state in the torque convertor 3 is cleared at the early stage to have the engine rotational speed Ne lowered to the normal idle rotational speed Y at the timing of the corrected idle-up finishing time Tc. Also, the turbine rotational speed Nt is concurrently be lowered as shown by a solid line 95.

As has been previously mentioned, the ECU 10 can recover the lost drive state with the engine rotational speed Ne raised by the accelerator operation until the process reaches the original idle-up finishing time T after the idle-up operation is executed. More specifically, the ECU 10 is adapted to set the idle-up finishing time Tc corrected to be shorter in a case that the accelerator operation is performed than the idle-up finishing time T in a case that the accelerator operation is not performed during the idle-up operation, so that the engine rotational speed Ne can be returned to the normal idle rotational speed Y at the early stage even when the lost drive state is maintained in the torque convertor 3.

The ECU 10 thus constructed can suppress the engine rotational speed Ne from being unnecessarily raised, and can suppress the excessive creep torque not intended by the driver from being generated.

The above first to fifth embodiments have been explained with the case in which the vehicle control apparatus is mounted on the FR (Front Engine Rear Drive) vehicle, however, the present invention is not limited to this type of vehicle. The vehicle control apparatus according to the present invention can be applied to a FF (Front Engine Front Drive) vehicle, a four-wheel-drive vehicle and the like.

Further, the above embodiments have been explained each raising as an example the automatic transmission 5 which realizes the change speed with a clutch-to-clutch type, however, the present invention is not limited to these embodiments. The vehicle control apparatus according to the present invention can be applied to a stepless speed change drive such as a CVT (Continuously Variable Transmission) and the like.

From the foregoing description, it will be understood that the vehicle control apparatus according to the present invention can improve the power transmission capability after the engine is started, and can suppress the starting capability from being lowered as compared with the conventional vehicle control apparatuses. The vehicle control apparatus according to the present invention is useful for the vehicle control apparatus provided with the power transmission device that transmits the power outputted from the drive source to the transmission mechanism.

EXPLANATION OF REFERENCE NUMERALS

1 . . . vehicle, 2 . . . engine, 3 . . . torque convertor, 4 . . . transmission mechanism, 5 . . . automatic transmission, 6 . . . hydraulic control circuit, 9L, 9R . . . drive wheels, 10 . . . ECU (control unit, setting unit, calculation unit), 21 . . . engine rotational speed sensor, 24 . . . throttle sensor, 25 . . . input shaft rotational speed sensor (rotational speed detection unit), 26 . . . output shaft rotational speed sensor, 28 . . . shift lever, 29 . . . operation position sensor (position detection unit), 30 . . . accelerator pedal 31 . . . accelerator opening degree sensor (accelerator detection unit), 32 . . . throttle valve, 33 . . . oil temperature sensor, 35 . . . start switch, 41 . . . pump impeller, 42 . . . input shaft, 43 . . . turbine runner, 45 . . . stator, 52 . . . output shaft, 61 . . . CPU, 62 . . . ROM, 63 . . . RAM, 64 . . . backup memory

What is claimed is:

1. A vehicle control apparatus, comprising:
   an engine;
   an automatic transmission connected with the engine, the automatic transmission including a torque convertor connected with the engine and a transmission mechanism connected with the torque convertor, the torque convertor including a pump impeller connected with the engine and a turbine runner connected with the transmission mechanism;
   drive wheels transmitted with the power of the engine through the automatic transmission;
   a rotational speed detector that detects the rotational speed of the turbine runner; and
   an electronic control unit configured to, when the rotational speed of the turbine runner is not raised and a standard time lapses after the engine is started, control the engine such that a rotational speed of the engine is raised, the standard time being a time for determining whether or not the torque convertor is in a lost drive state.

2. The vehicle control apparatus according to claim 1, wherein
   the electronic control unit is configured to set a finishing time indicative of a duration until the rotational speed of the engine is returned to a normal idle rotational speed after the rotational speed of the engine is raised,
   the electronic control unit is configured to control the engine such that the rotational speed of the engine is returned to the normal idle rotational speed after the lapse of the finishing time, and
   the electronic control unit is configured to set the finishing time such that a time period to raise the rotational speed of the engine is shortened as the temperature of oil to be supplied to the torque convertor increases.

3. The vehicle control apparatus according to claim 1, wherein
   the electronic control unit is configured to set a finishing time indicative of a duration until the rotational speed of the engine is returned to a normal idle rotational speed after the rotational speed of the engine is raised,
   the electronic control unit is configured to control the engine such that the rotational speed of the engine is returned to the normal idle rotational speed after lapse of the finishing time, and
   the electronic control unit is configured to set the finishing time such that a time period to raise the rotational speed of the engine is shortened as a time period until the rotational speed of the turbine runner reaches a predetermined rotational speed decreases.

4. The vehicle control apparatus according to claim 1, further comprising:
   a position detector that detects a position of a shift lever for changing a state of the automatic transmission, wherein
   the electronic control unit is configured to calculate a speed ratio of the rotational speed of the turbine runner and the rotational speed of the engine,
   the electronic control unit is configured to control the engine such that the rotational speed of the engine become another rotational speed when the speed ratio calculated by the electronic control unit is less than a predetermined threshold value and the position detector detects a changing position from a non-drive position to a drive position of the shift lever during the rotational speed of the engine raised, the another rotational speed is larger than a normal idle rotational speed and smaller than the rotational speed raised at the time of the shift lever taking the non-drive position.

5. The vehicle control apparatus according to claim 1, wherein the electronic control unit is configured to stop raising the rotational speed when the rotational speed of the turbine runner is not raised and a predetermined time is lapsed after the rotational speed of the engine is raised.

6. The vehicle control apparatus according to claim 1, further comprising:
   an accelerator detector that detects an operation state of an accelerator for adjusting an output of the engine, wherein
   the electronic control unit is configured to set a finishing time indicative of a duration until the rotational speed of the engine is returned to a normal idle rotational speed after the rotational speed of the engine is raised,
   the electronic control unit is configured to set the finishing time such that a that a time period to raise the rotational speed of the engine is shortened when the operation of the accelerator performed is detected by the accelerator detector than when the operation of the accelerator not performed is detected by the accelerator detector while the rotational speed of the engine is raised.

* * * * *